United States Patent

Power et al.

[11] Patent Number: 5,982,924
[45] Date of Patent: Nov. 9, 1999

[54] METHOD AND SYSTEM FOR REPRODUCING COLOR IMAGES AS DUOTONES

[75] Inventors: Joanna L. Power, Seattle, Wash.; Brad S. West, Richmond, Calif.; Eric J. Stollnitz; David H. Salesin, both of Seattle, Wash.

[73] Assignee: University of Washington, Seattle, Wash.

[21] Appl. No.: 08/904,945

[22] Filed: Aug. 1, 1997

Related U.S. Application Data

[60] Provisional application No. 60/022,974, Aug. 2, 1996.

[51] Int. Cl.⁶ .................................................. G06K 9/00
[52] U.S. Cl. ........................................ 382/162; 395/109
[58] Field of Search .................................. 382/162, 163, 382/164, 167, 112; 395/109; 345/114, 150, 153, 510; 358/518, 520

[56] References Cited

U.S. PATENT DOCUMENTS

| | | | |
|---|---|---|---|
| 5,047,842 | 9/1991 | Bouman, Jr. et al. | 358/75 |
| 5,185,661 | 2/1993 | Ng | 358/75 |
| 5,237,517 | 8/1993 | Harrington et al. | 364/526 |
| 5,611,030 | 3/1997 | Stokes | 395/131 |
| 5,644,509 | 7/1997 | Schwartz | 364/526 |
| 5,740,333 | 4/1998 | Yoh et al. | 395/109 |

OTHER PUBLICATIONS

F.R. Clapper and J.A.C. Yule. The effect of multiple internal reflections on the densities of half–tone prints on paper. *Journal of the Optical Society of America*, 43(7):600–603, Jul. 1953.

Ronald S. Gentile and Jan P. Allebach. A comparison of techniques for color gamut mismatch compensation. In Human Vision, Visual Processing, and Digital Display, vol. 1077 of *Proceedings of the SPIE*, pp. 342–354. SPIE, Bellingham, WA, 1989.

Andrew S. Glassner, Kenneth P. Fishkin, David H. Marimont, and Maureen C. Stone. Device–directed rendering. *ACM Transactions on Graphics*, 14(1):58–76, Jan. 1995.

Arthur C. Hardy and F.L. Wurzburg, Jr. Color correction in color printing. *Journal of the Optical Society of America*, 38(4):300–307, Apr. 1948.

Kansei Iwata and Gabriel Marcu. Computer simulation of printed colors on textile materials. In Color Hard Copy and Graphic Arts III, vol. 2171 of *Proceedings of the SPIE*, pp. 228–238. SPIE, Bellingham, WA 1994.

Henry R. Kang. Applications of color mixing models to electronic printing. *Journal of Electronic Imaging*, 3(3:276–287, Jul. 1994.

(List continued on next page.)

*Primary Examiner*—Amelia Au
*Assistant Examiner*—F. E. Cooperrider
*Attorney, Agent, or Firm*—Ronald M. Anderson

[57] ABSTRACT

A full color process image that can be printed with cyan, magenta, yellow, and black inks is produced as a duotone image using only two colors of ink. Color data defining the colors used in the full color image serve as input to a process that maps the colors into a duotone gamut defined by the two colors of ink that will be used to produce the duotone image. A user is able to select 0, 1, or 2 colors of ink for the duotone image, and the software program automatically chooses the remaining ink or inks so as to reproduce the image as accurately as possible; the software also produces the appropriate color separations automatically. In addition, the paper color can be specified by the user or optimally determined by the optimizing process of the software to optimize the duotone image reproducing a full color image that has little white. The paper color provides a free third color. A black separation can also optionally be included when printing the duotone image to expand the range of luminance available. When black ink is used, some amount of black is subtracted from the each color of the original image before the optimization and mapping process is applied, and the black separation is determined to add back the appropriate amount of black when printing the duotone image. The duotone images produced by the method are relatively high-quality, economical alternatives to full-color printing.

38 Claims, 14 Drawing Sheets

OTHER PUBLICATIONS

Bruce J. Lindbloom. Accurate color reproduction for computer graphics applications. In *Proceedings of SIGGRAPH '89*, pp. 117–126. ACM, New York, 1989.

Gabriel Marcu and Satoshi Abe. Color designing and simulation in non–conventional printing process. In Applications of Digital Image Processing XVII, vol. 2298 of *Proceedings of the SPIE*, pp. 216–223. SPIE, Bellingham, WA, 1994.

H.E.J. Neugebauer. Die Theoretischen Grundlgen des Mehrfarbenedruckes (The theoretical foundation for multicolor printing). *Z. Wiss Photogr.*, pp. 73–89, 1937. Reprinted in Sayanai [20], pp. 194–202.

Victor Ostromoukhov. Chromaticity gamut enhancement by hepatone multi–color printing. In Device–Independent Color Imaging and Imaging Systems Integration, vol. 1909 of *Proceedings of the SPIE*, pp. 139–151. SPIE, Bellingham, WA, 1989.

Victor Ostromoukhov and Roger D. Hersch. Artistic screening. In *Proceedings of SIGGRAPH 95*, pp. 219–228. ACM, New York, 1995.

Warren Rhodes. Fifty years of the Neugebauer equations. In Sayanai [20], pp. 7–18.

Maureen C. Stone, William B. Cowan, and John C. Beatty. Color gamut mapping and the printing of digital color images. *ACM Transactions on Graphics*, 7(4):249–292, Oct. 1988.

Johannes von Kries. Chromatic adaptation. In David L. MacAdam, editor, *Sources of Color Science*, pp. 109–119, MIT Press, Cambridge, MA, 1970.

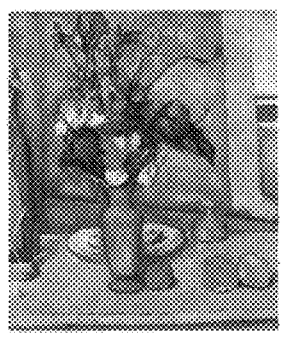
*FIG. 11A*
  
*FIG. 11B*  *FIG. 11C*  *FIG. 11D*
*FIG. 12A*
*FIG. 12B*
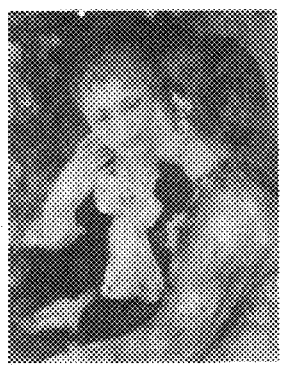
*FIG. 13A*
 
 
*FIG. 13B*  *FIG. 13C*

METHOD AND SYSTEM FOR REPRODUCING COLOR IMAGES AS DUOTONES

RELATED APPLICATION

This application is based on prior copending provisional application Ser. No. 60/022,974, filed Aug. 2, 1996, the benefit of the filing date of which is hereby claimed under 35 U.S.C. § 119(e).

This invention was made with government support under Grant No. N00014-95-1-0728, awarded by the Office of Naval Research, and under Grant No. CCR-9553199, awarded by the National Science Foundation.

FIELD OF THE INVENTION

The present invention generally pertains to printing full colored images using only two colors of ink, and more specifically, to a method and system employed for selecting the colors of the two inks that will be used and mapping colors from the full color image to the duotone colors so as to reproduce the full color image as closely as possible.

BACKGROUND OF THE INVENTION

Modern color reproduction typically employs a fixed set of process ink colors that include cyan, magenta, yellow, and sometimes black. Placed on top of one another and in juxtaposition, these inks can be used to reproduce a range of colors called their gamut. Although the standard process colors were carefully chosen to provide a relatively large gamut, this gamut is nevertheless quite limited when compared to the full range of colors visible to the human eye. Thus, color fidelity must generally be compromised when reproducing images with process colors (or any other small, fixed set of color inks).

The problem is even more apparent when fewer than four color inks are used for printing an image. For example, one alternative to printing an image with the conventional four colors of ink (and black) as noted above, is the duotone process, in which just two colored inks are used. While duotones obviously have more limited color gamuts than three- and four-ink processes, they can nevertheless be used to reproduce a surprising range of color. A duotone print is really a combination of four colors: the paper color alone, the colors of each of the inks individually, and the color of the two inks superimposed on each other. These four colors define a bilinear surface in color space that may span a broad range of the full color gamut.

Duotone printing has traditionally been used almost exclusively to enhance monochrome gray-scale images with a tint of color. There are several advantages to using the duotone technique over the conventional four color printing process. First, duotone printing is significantly less expensive than process color, typically about two-thirds the cost. Thus, there is a clear economic advantage in using duotones for images that are adequately reproduced in this way. Second, a user can select one or both of the two printing inks to meet constraints, such as matching the precise colors of one or more corporate color inks. Also, because a large number of printing presses are two-color presses, printed documents are often designed for just two inks, generally black (for text) and one additional color.

It does not appear that any prior art teaches a general approach to reproducing images using duotones. The most closely related work in the field of computer graphics addresses the problem of gamut mapping, or smoothly mapping the colors of an original image to those available on an output device. Fundamentally, a duotone gamut is much more restricted than the gamut of a typical output device. The mapping approaches disclosed in the prior art provide for mapping from a broader range of colors to a more limited gamut in three dimensions. However, the prior art does not disclose a process for mapping a three-dimensional gamut to a gamut comprising a two-dimensional surface. The prior art also discloses creating a "highlight color image," a specialized duotone in which one ink (of the two inks used) is black.

There are a few articles in the optical engineering literature on calculating halftone separations for inks other than the standard four-color process inks. One reference describes how to compute separations when printing with an arbitrary number of inks. However, all of the inks and the order in which they will be printed must be specified by the user. Furthermore, the reference does not specify how to handle a color that is out of a gamut (the common case when mapping a full color image to a duotone gamut). Another prior art reference describes how the traditional process-color printing gamut can be extended by introducing additional basic colors.

In the printing industry, a number of empirical studies have developed improved models for halftone color reproduction. However, it would be preferable to adjust the output of the duotone model according to an empirically determined correction factor. One author has taught a similar approach, though he assumes that each ink can be corrected independently, rather than adjusting the duotone gamut as a whole.

To better understand the problems that arise in selecting the colors that will be used for a duotone image and in mapping the colors from a fill color image to the more limited gamut of the duotone image, it should be helpful to first discuss the topics of: color and color spaces, color halftone printing, and the Neugebauer halftone model. The following addresses these topics.

Color and Color Spaces: Color is determined by the intensity of light in the range of visible wavelengths from about 400 nm to 700 nm. According to the tristimulus theory of color perception, all colors can be reproduced using combinations of three primary wavelengths (roughly corresponding to red, green, and blue). Thus, color can be expressed as a function of wavelength, known as a spectral reflectance, or as a three-dimensional quantity.

The XYZ color space was developed in 1931 by the Commission Internationale de l'Éclairage (CIE) to standardize color specification. The XYZ color space is additive, meaning that the color resulting from the superposition of two colored light sources can be calculated by simply adding the coefficients of the two known colors. A spectral reflectance can be converted to XYZ coordinates by integrating the spectral information against three functions x, y, and z. The computer graphics community is more familiar with the RGB color space, an additive color space that is device dependent. Conversion between RGB and XYZ coordinates can be accomplished by a linear transform if the XYZ coordinates of the device's red, green and blue primaries are known.

In contrast to additive color spaces, perceptually uniform color spaces allow the difference between two colors (as perceived by the human eye) to be measured as the distance between points. For example, two colors $c_1$ and $c_2$, separated by some distance d in a perceptually uniform color space, appear about as different as two other colors $c_3$ and $c_4$ separated by the same distance d. The (CIE) developed two perceptually uniform spaces: L*a*b* and L*u*v*. Both color spaces require the definition of a reference white, which is usually taken to be a standard light source defined by the (CIE). In both spaces, L* indicates brightness and has a value of 100 for reference white. Though neither L*a*b* nor L*u*v* is perfectly perceptually uniform, both come close to satisfying the condition that colors separated by the same distance appear equally similar.

Color Halftone Printing: In color halftone printing, a continuous-tone image is reproduced by printing a number of versions of the image atop one another. Each version, known as a halftone separation, consists of various sized dots of a single ink. Color halftone printing differs from color dithering on monitors in that subtractive effects as well as additive effects play a role. The subtractive effect of superimposing dots of different color produces the set of printing primaries for a particular set of inks. For example, for cyan, magenta, and yellow ink printed on white paper, the set of printing primaries is cyan, magenta, yellow, blue (cyan+magenta), green (cyan+yellow), red (magenta+yellow), black (cyan+magenta+yellow), and white (no ink). The additive effect of juxtaposing dots of different sizes produces the entire set, or gamut, of colors that can be achieved by printing halftone separations using a particular set of inks. FIG. 1 illustrates the reproduction of a full color image 30 using cyan, magenta, yellow, and black inks. In this Figure, a small square 32 is enlarged, and then a small square 34 in square 32 is again enlarged to show how dots of cyan, magenta, yellow, and black are printed to visually provide a full range of colors in the full color image.

Neugebauer Halftone Model: In 1937, H. E. J. Neugebauer developed a series of equations that, given ink and paper colors, describe the amount of each ink needed to reproduce a given color. Intuitively, the model says that the overall color of a small area is a weighted average of the printing primaries, with each primary weighted by the relative area it covers. For example, in a square printed with cyan, magenta and yellow ink on white paper, the contribution of blue is given by the fraction of the square that is covered by cyan and magenta but not yellow. If $\alpha_1$, $\alpha_2$, and $\alpha_3$ are the amounts of cyan, magenta, and yellow ink printed, then the contribution of blue is $\alpha_1\alpha_2(1-\alpha_3)$.

The "Neugebauer equations" express colors in terms of their coordinates in the XYZ color space. The Neugebauer model was originally designed to describe three-color printing, though it can be generalized to handle any number of inks. If $g_0$ is the color of the paper, $g_i$ is the color of ink i on the paper, $g_{ij}$ is the color of inks i and j superimposed on the paper, $g_{i,j,k}$ is the color of all three inks i, j, and k superimposed on the paper, and $\alpha_i$ is the amount of ink i (between 0 and 1). For three inks, the Neugebauer model describes c, a color in the printing gamut, in terms of the eight printing primaries and the amounts of the three inks required to achieve c:

$$c = [g_0 \ g_1 \ g_2 \ g_3 \ g_{1,2} \ g_{1,3} \ g_{2,3} \ g_{1,2,3}] \begin{bmatrix} (1-\alpha_1)(1-\alpha_2)(1-\alpha_3) \\ \alpha_1(1-\alpha_2)(1-\alpha_3) \\ (1-\alpha_1)\alpha_2(1-\alpha_3) \\ (1-\alpha_1)(1-\alpha_2)\alpha_3 \\ \alpha_1\alpha_2(1-\alpha_3) \\ \alpha_1(1-\alpha_2)\alpha_3 \\ (1-\alpha_1)\alpha_2\alpha_3 \\ \alpha_1\alpha_2\alpha_3 \end{bmatrix}$$

The prior art does not teach mapping from a three-dimensional color space to the two-dimensional gamut used for duotone printing. More importantly, there is no teaching in the art of determining the best color inks from those that are available to print a duotone image corresponding to a full color image so as to most accurately retain the "appearance" (or other selected attributes) of the full color image. To provide more versatility in such a process, it would be desirable to enable a user to select one of the color inks and then automatically determine the other color ink that should preferably be used for printing the duotone image. Clearly, it would also be desirable in a variety of situations to enable one or both duotone separations (the ink colors used) to be automatically determined for a specific colored paper that is selected by a user. As one example, this capability could be useful for creating duotone separations of full-color images for printing in a "yellow pages" telephone directory.

SUMMARY OF THE INVENTION

In accord with the present invention, a method is defined for producing a duotone image using only two colors. The duotone image corresponds to a full color image defined by color data. The method includes the steps of enabling a user to select from zero to two colors that will be used to produce the duotone image. A gamut is determined that includes any color selected by the user and is defined by the two colors that will be used for producing the duotone image. Each color that is not selected by the user for the gamut is automatically determined. The color data for the full color image is mapped onto the gamut to determine duotone data that define how the two colors are combined to produce the duotone image. The duotone data are determined so as to maximize preservation of selected predetermined attributes of the full color image in the duotone image.

Optionally, the method further includes the step of enabling the user to select a background color for the duotone image. If the user does not select a background color, a background color is automatically determined for the duotone image so as to maximize preservation of the selected predetermined attributes of the full color image in the duotone image.

The step of mapping the color data preferably comprises the step of scaling luminance values for the full color image to a range of luminance values for the gamut. A relative luminance of the full color image is thus one of the plurality of predetermined attributes, and preservation of the relative luminance has the highest priority when mapping the color data for the full color image to the gamut.

The step of mapping preferably comprises the step of scaling the predetermined attributes along two of three orthogonal axes, so that the predetermined attributes are disposed about the gamut. Two of the three orthogonal axes are respectively a relative luminance axis and a color variation axis. The step of scaling comprises the step of selecting a plurality of different values on the relative luminance axis as prospective origins of the color variation axis. For each value selected on the relative luminance axis, the color variation is scaled along a corresponding color variation axis. When scaling the color variation, colors in the full color image that are outside the gamut are transformed into colors within the gamut. Colors in the full color image that are further from the gamut are shifted proportionately more when thus transformed, than colors in the full color image that are closer to the gamut. The method also includes the step of projecting a third axis that is orthogonal to the relative luminance axis and the color variation axis, by determining a cross product of the relative luminance axis and the color variation axis. The third axis at least approximates an average normal of a bilinear surface of the gamut.

The step of automatically selecting each color not selected by the user preferably comprises the step of employing a simulated annealing technique that is sensitive to local minima.

In addition, the method optionally includes the step of clustering colors in the full color image. Any clusters of colors that are outside the gamut are classified as outlying colors, which may not be considered in the step of mapping the color data for the full color image onto the gamut. As a further alternative, the method may include the step of employing a black separation to produce the duotone image, in addition to the two colors. In this case, the method may also include the step of removing a portion of black from the full color image before the step of mapping the color data for the full color image. The black separation is then determined so as to restore to the duotone image at least some of a full range of luminance that is present in the full color image.

Further aspects of the present invention are directed to a system for defining a duotone image corresponding to a full color image. The duotone image is produced using two colors. The system includes a memory for storing machine language instructions that define functions implemented by a processor when executing the machine instructions. These functions are generally consistent with the method discussed above.

BRIEF DESCRIPTION OF THE DRAWING FIGURES

The file of this patent contains at least one drawing executed in color. Copies of this patent with color drawing (s) will be provided by the Patent and Trademark Office upon request and payment of the necessary fee.

The foregoing aspects and many of the attendant advantages of this invention will become more readily appreciated as the same becomes better understood by reference to the following detailed description, when taken in conjunction with the accompanying drawings, wherein.

Figure 1:
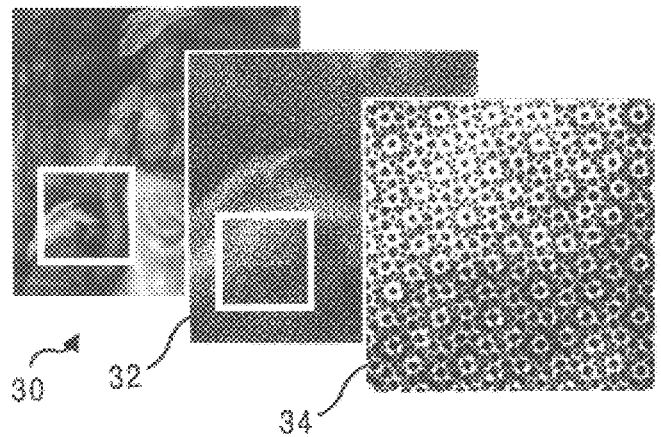
FIG. 1 (PRIOR ART) is a full color image and two increasingly enlarged portions thereof.
Figure 8:
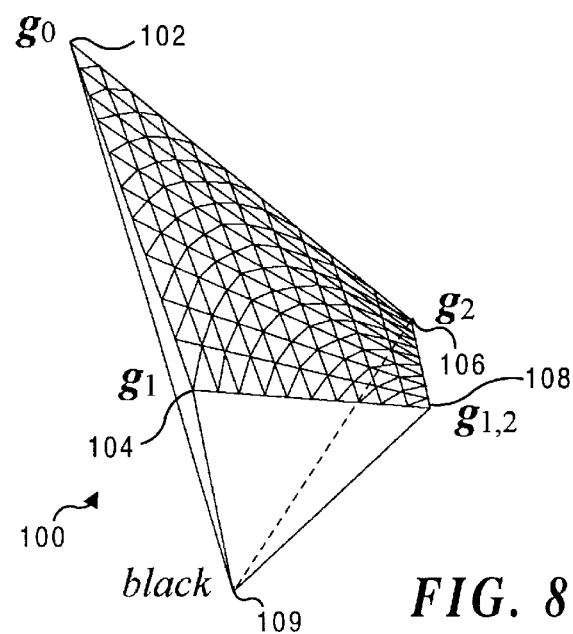
Figure 10A:
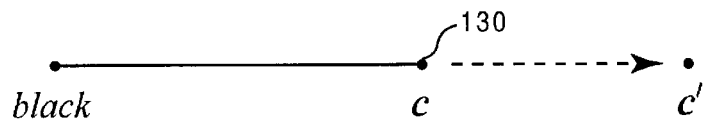
Figure 10B:
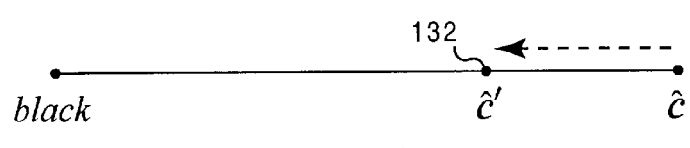
Figure 9:
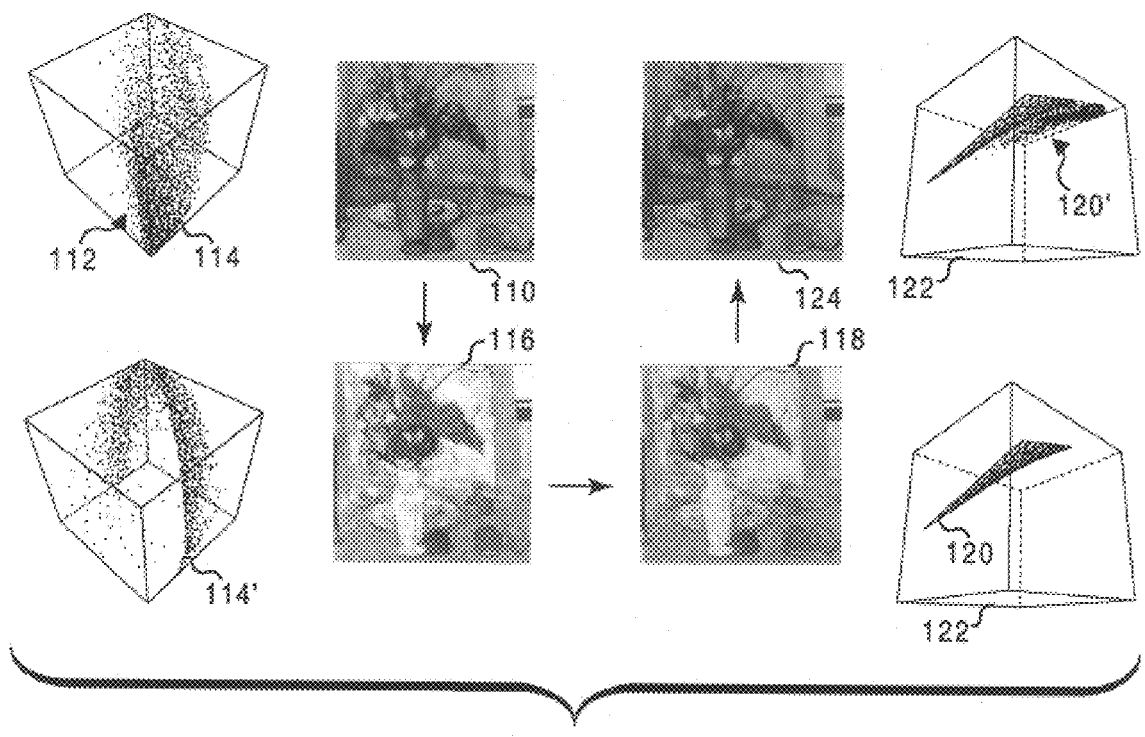
Figure 14A:
Figure 14B:
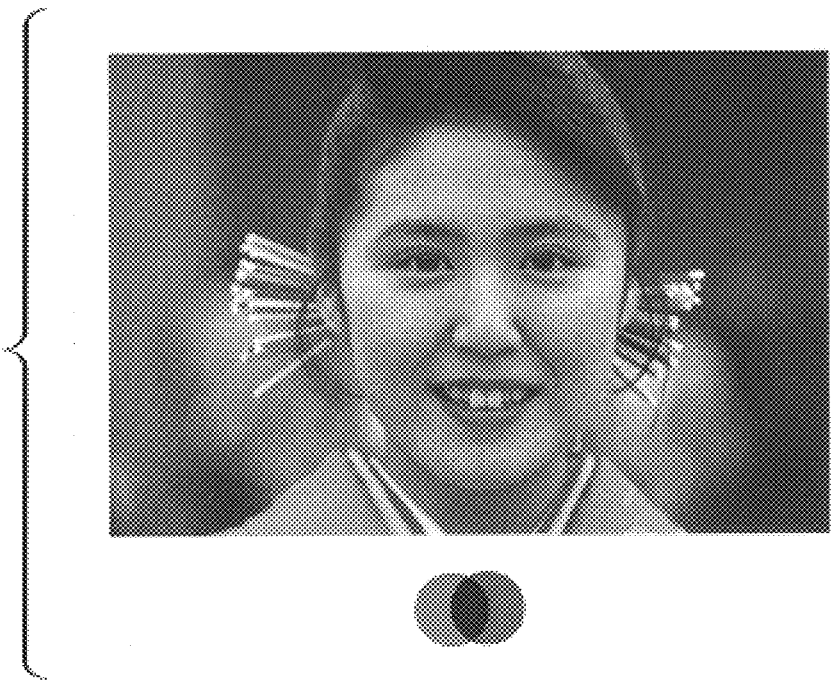
Figure 15A:
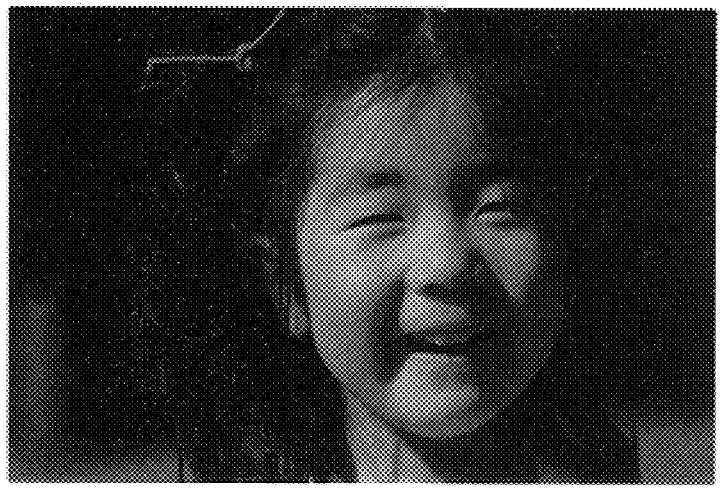
Figure 16A:
Figure 16B:
Figure 16B:
Figure 17A:
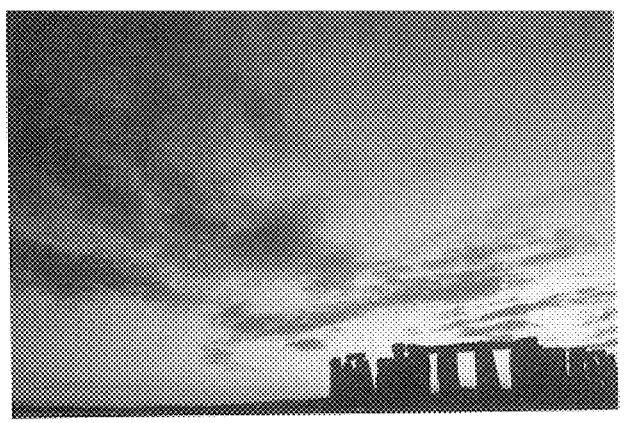
Figure 17B:
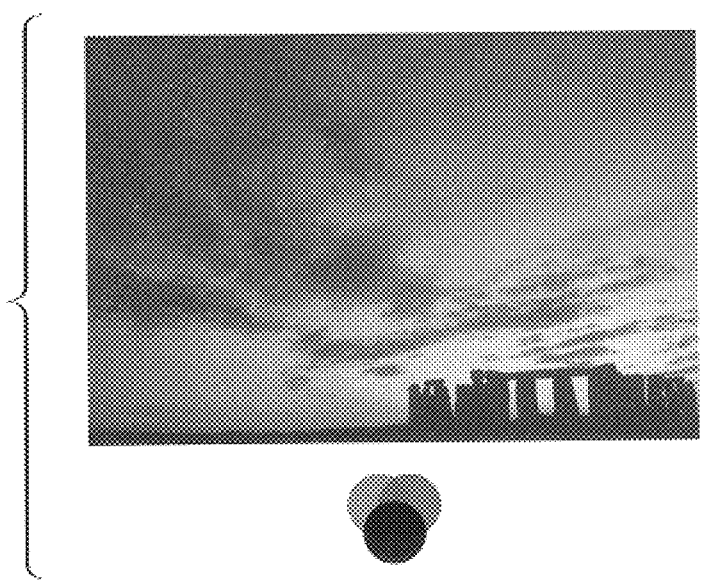
Figure 17C:
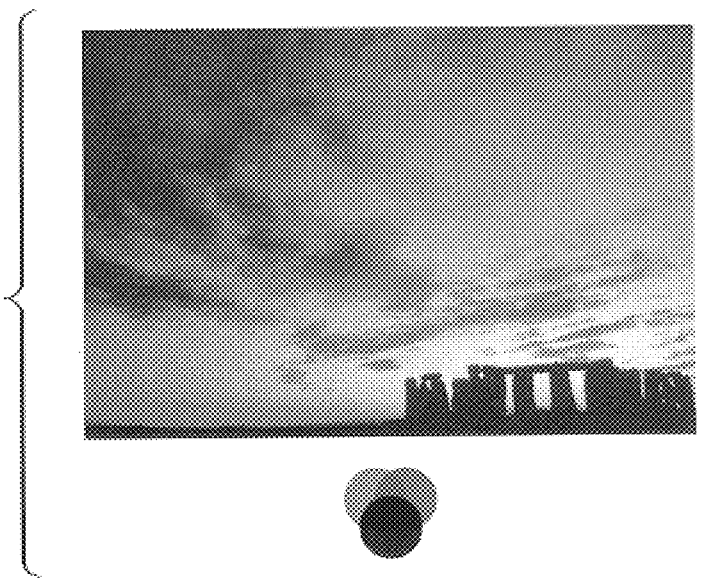
Figure 18A:
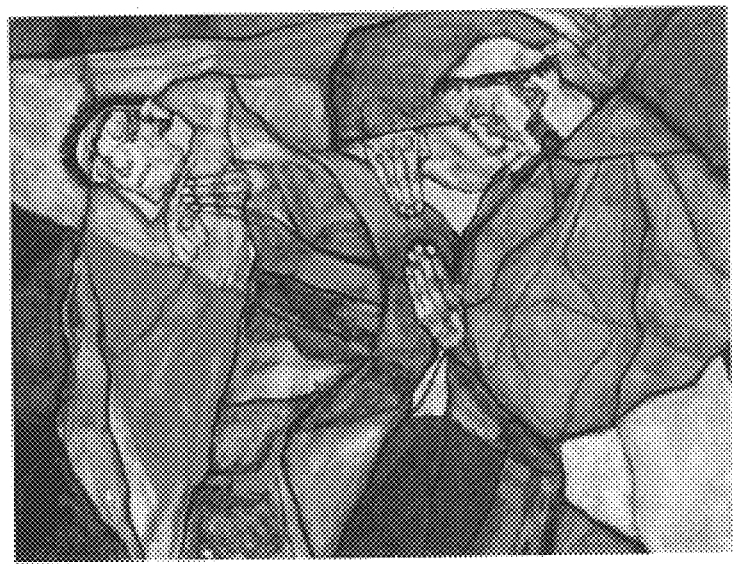
Figure 18B:
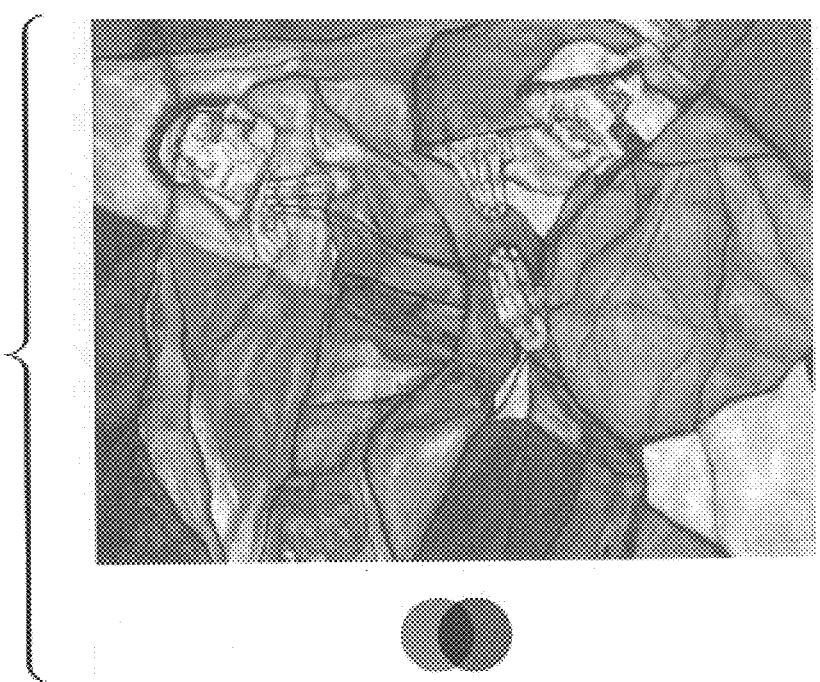
Figure 19:
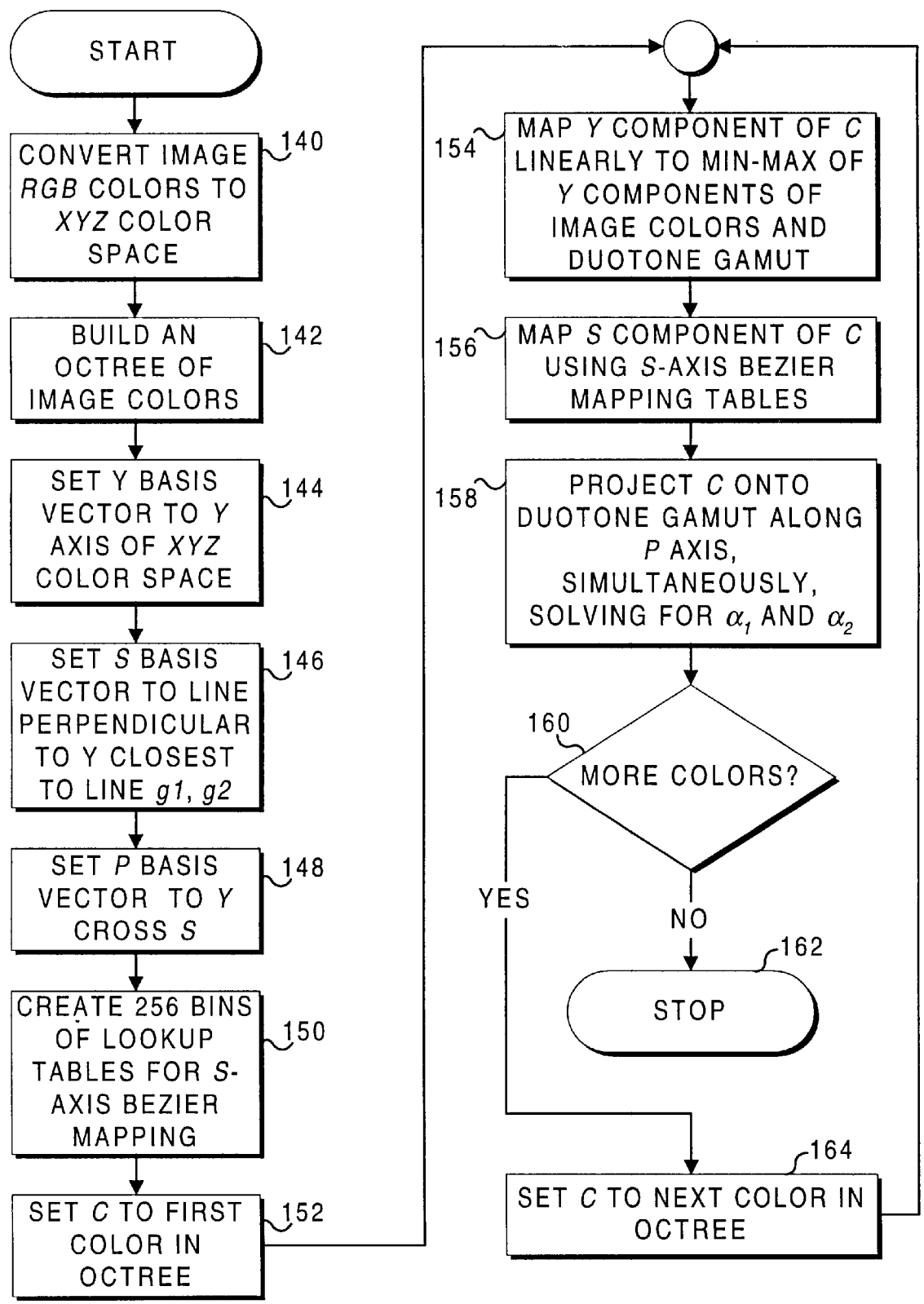
Figure 20:
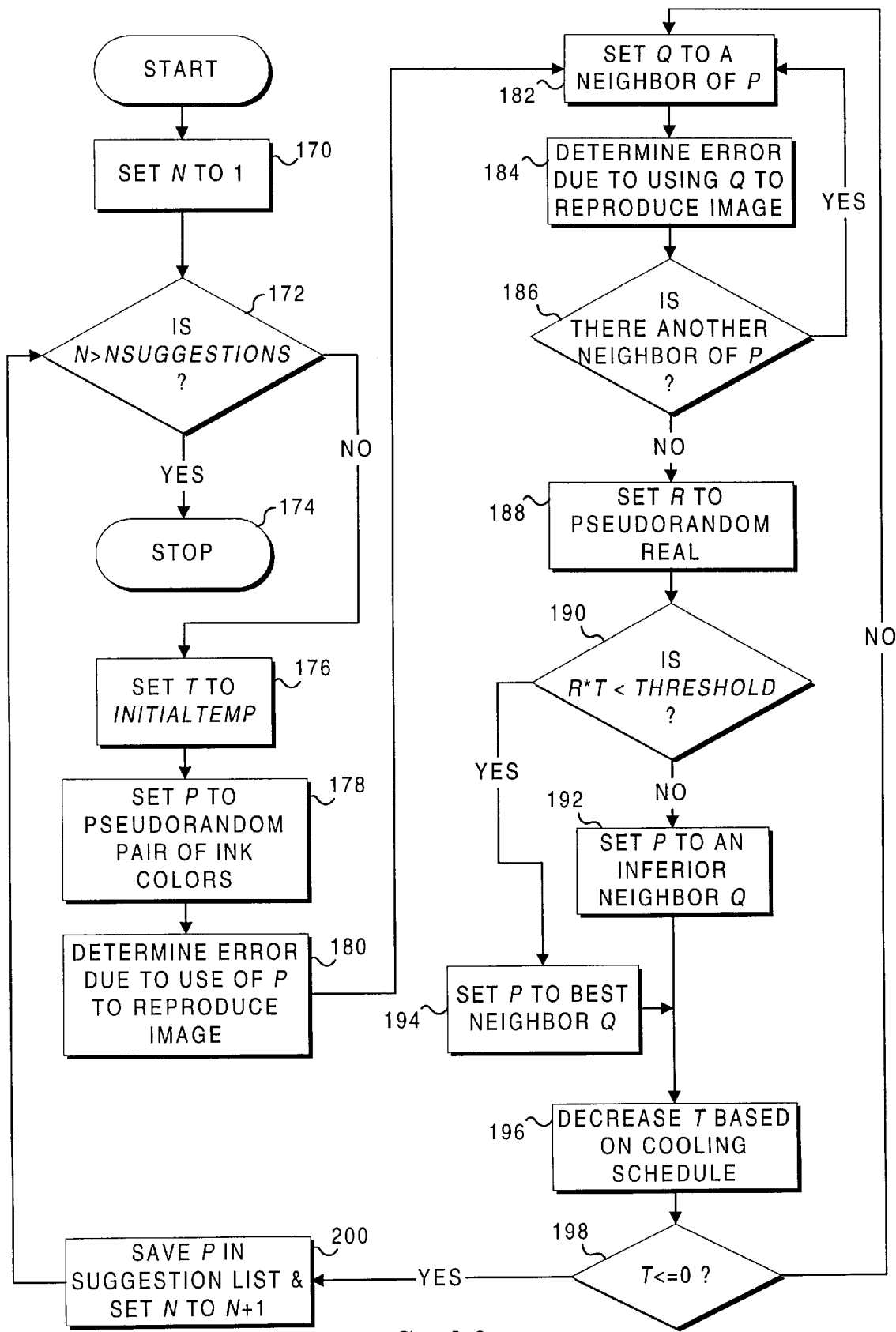
Figure 21:
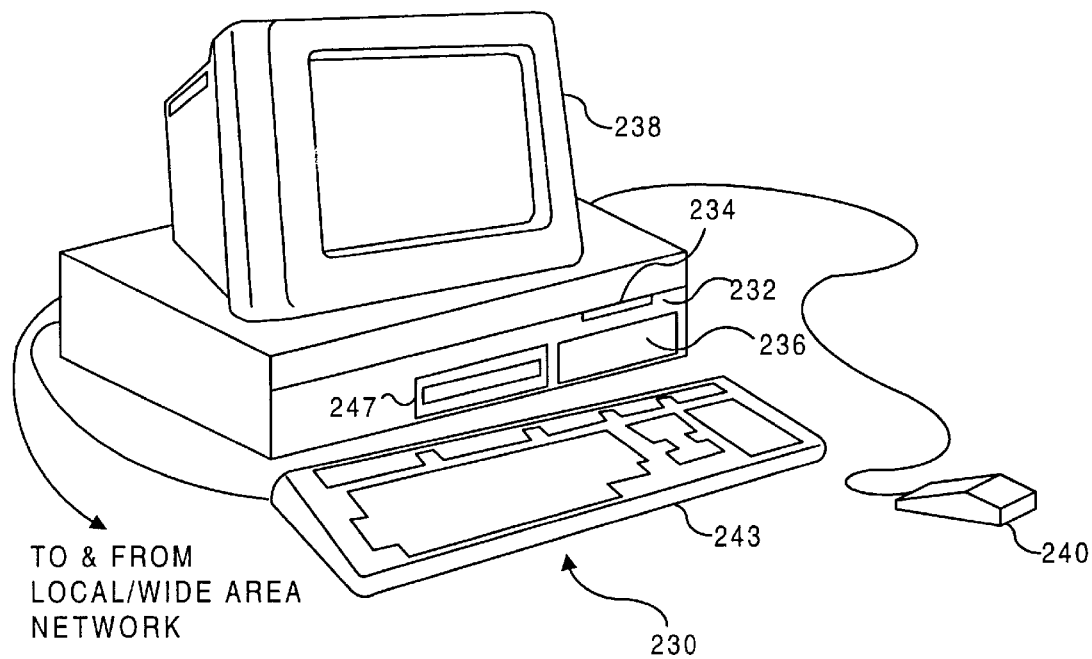
Figure 22:
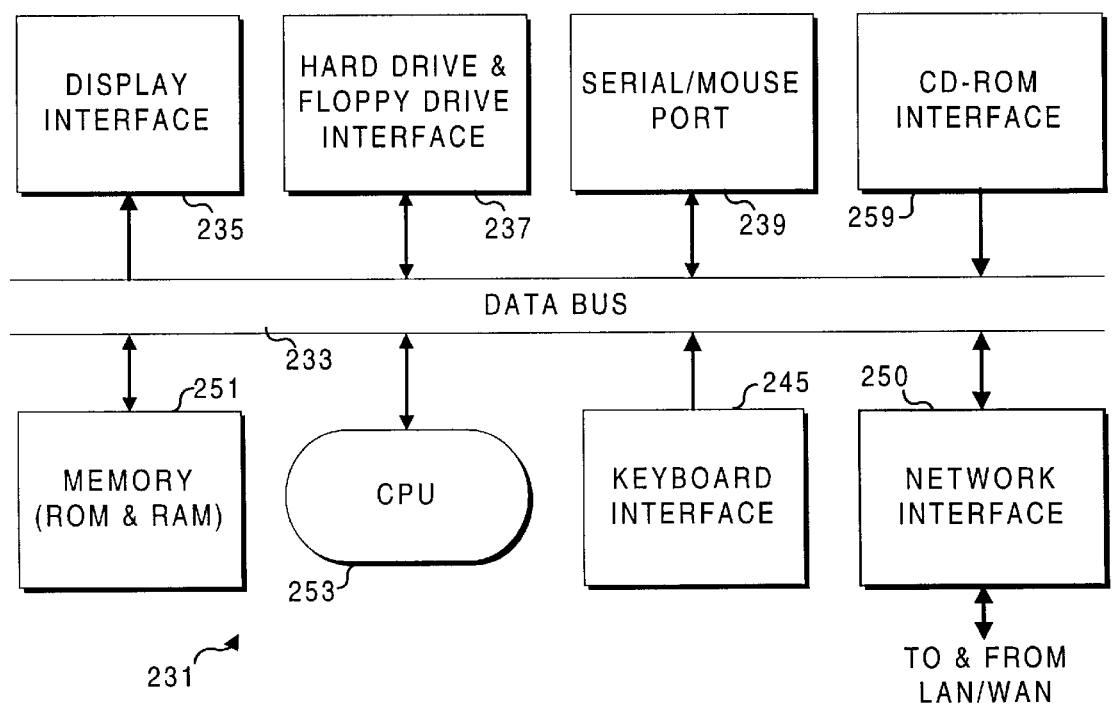

5 FIG. 8 is a black-enhanced duotone that is used when black ink is provided for printing a duotone image, in addition to the two colors of ink;

FIG. 9 includes four images showing the images at each step employed for producing a black-enhanced duotone image in accord with the present invention;

FIG. 10A is a graph illustrating the reduction of black in a color;

FIG. 10B is a graph illustrating the replacement of black in a duotone image color;

FIGS. 11A–11D are, respectively, a full color image of Cezanne's Blue Vase, a traditional (PRIOR ART) duotone image printed with PANTONE 130 and process black ink, a corresponding duotone image prepared using the present invention, and a black-enhanced duotone image prepared in accord with the present invention and printed using PANTONE 198, PANTONE 604, and PANTONE Process Black inks;

FIGS. 12A and 12B are, respectively, a full color image of a koala and a duotone image produced in accord with the present invention and printed using PANTONE 144 and PANTONE 546 inks;

FIGS. 13A, 13B, and 13C are, respectively, a full color print of Renoir's Women, a duotone image produced in accord with the present invention and printed using PANTONE 144 and PANTONE 546 inks, and a duotone image produced in the same manner, but printed with PANTONE 172 and PANTONE 354 inks;

FIGS. 14A and 14B are, respectively, a full color print of a woman, and a corresponding duotone image produced using the present invention and printed with PANTONE 152 and PANTONE Process Blue inks;

FIGS. 15A and 1 5B are, respectively, a full color print of a girl, and a corresponding duotone image produced using the present invention and printed with PANTONE 152 and PANTONE Process Blue inks;

FIGS. 16A and 16B are, respectively, a full color print of three boys, and a corresponding duotone image produced using the present invention and printed with PANTONE 152 and PANTONE Process Blue inks;

FIGS. 17A, 17B, and 17C are, respectively, a full color print of a sunset, a corresponding duotone image produced using the present invention and printed with PANTONE 151, PANTONE 246, and PANTONE Process Black inks, corrected to match the process-color print in FIG. 17A, and, a corresponding duotone image produced using the present invention and printed with the same inks as FIG. 17B, but without correction in order to obtain colors outside the gamut of process color printing;

FIGS. 18A and 18B are, respectively, a full color print of Schiele's Agony, and a corresponding duotone image produced using the present invention and printed with PANTONE 329 and PANTONE Warm Red inks on yellow paper;

FIG. 19 is a flow chart showing the steps used for mapping color data from a full color image to a duotone gamut;

FIG. 20 is a flow chart showing the logical steps used for applying simulated annealing to determine pairs of colors for use in defining a duotone gamut;

FIG. 21 is an isometric view of a generally conventional graphics workstation suitable for implementing the present invention; and FIG. 22 is block diagram showing internal components of the workstation of FIG. 22.

DESCRIPTION OF THE PREFERRED EMBODIMENTS

While the following description of the preferred embodiment discloses other aspects, the present invention is at least in part directed to the following problem:

Given: A color image C, a paper color, the set of all available printing inks I, and a subset of k=0, 1, or 2 inks in I that are chosen by the user.

Find: The best 2−k additional inks for reproducing C on the selected paper, along with the appropriate color separations.

In disclosing the present invention, it is initially assumed that the user has specified both colors of ink to be used for printing the duotone image or that the program has determined the two colors, so that the remaining problem to be solved is determining how best to map the full color image data into a gamut for the duotone image determined by the two selected colors. The other problem of automatically determining the one or two colors of ink that should be used for printing the duotone image, which are not specified by the user, is also discussed below.

Neugebauer Model For Duotone Printing

For two-color printing, the Neugebauer model describes c, a color in the printing gamut, in terms of the four printing primaries and the amounts of the two inks, $g_1$ and $g_2$:

$$c = [\, g_0 \;\; g_1 \;\; g_2 \;\; g_{1,2}\,] \begin{bmatrix} (1-\alpha_1)(1-\alpha_2) \\ \alpha_1(1-\alpha_2) \\ (1-\alpha_1)\alpha_2 \\ \alpha_1\alpha_2 \end{bmatrix}$$

Figure 2:
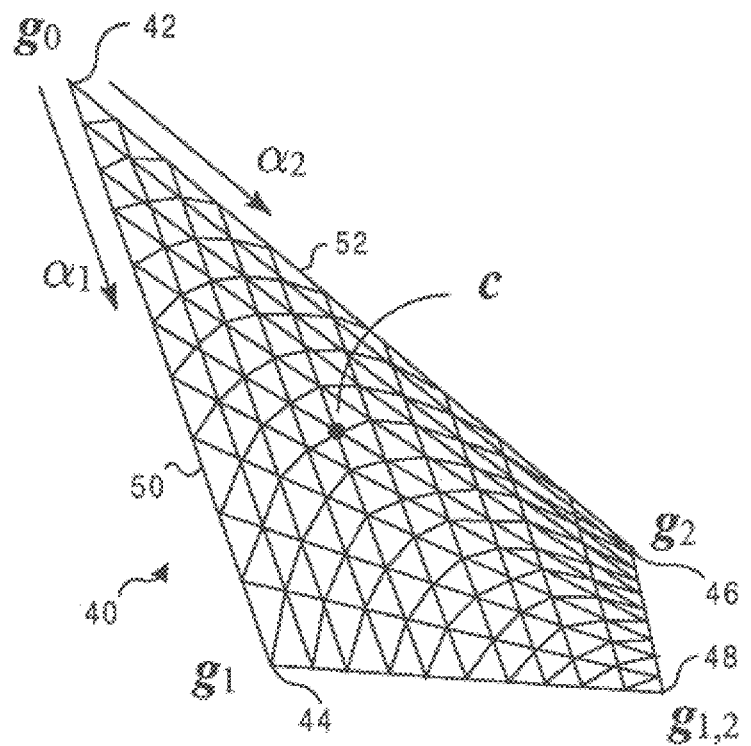
FIG. 2 (PRIOR ART) is a conventional duotone gamut, which is a bilinear surface in additive color space.

The gamut described by the above equation is a bilinear surface in an additive color space such as XYZ or RGB, as shown in FIG. 2. In this Figure, a point 42 at go corresponds to the background color (e.g., the color of the paper on which the duotone image will be printed), points 44 and 46 at $g_1$ and $g_2$, correspond to the pure ink colors that are used to print the duotone image, and a point 48 at $g_{1,2}$ corresponds to the combination of the two pure ink colors, i.e., the darkest color that can be produced by combining the two ink colors. The variables $\alpha_1$ and $\alpha_2$ specify distances along edges 50 and 52, respectively, of the duotone gamut.

Finding the Duotone Gamut

The duotone gamut is fully specified by the Neugebauer model given the printing primaries $g_0$, $g_1$, $g_2$ and $g_{1,2}$. In developing the present invention, spectral reflectance data for inks and papers were obtained using a COLORTRON™ spectrophotometer. The COLORTRON™ software provides data for PANTONE® ink sets. In order to find the printing primaries, the color of inks printed on a selected paper was estimated. Also estimated were the color of two inks superimposed on the selected paper.

A simple model was used to approximate the effect of printing ink on a selected paper. The data for a layer of ink or paper can be expressed in two parts: an overall reflectance spectrum R and a Fresnel reflectance spectrum F. The overall reflectance spectrum indicates how much light of each wavelength is reflected back by the layer and can be directly measured with a spectrophotometer. The Fresnel information indicates how much light of each wavelength bounces off the surface of the layer without entering the layer.

Inks act very much like filters, which are purely subtractive layers. A paper acts like an opaque layer. This simple behavior enables the layer composition to be approximated by multiplying reflectance spectra and adjusting for Fresnel effects. To approximate the result of superimposing a subtractive layer i on another layer j, the Fresnel component is removed from each layer's overall reflectance, the thus altered spectra are multiplied, and the Fresnel reflectance of the top layer is added back to the result:

$$R_{i,j} = (R_i - F_i)(R_j - F_j) + F_i$$

$$F_{i,j} = F_i$$

Since the Fresnel component of reflectance cannot be directly measured, the Fresnel spectrum of an ink is approximated by the reflectance spectrum of black ink. The intuition behind this approximation is that black absorbs nearly all incident light; thus, any reflectance from a layer of black ink is primarily due to a Fresnel effect at the surface. For simplicity, the same Fresnel spectrum is used for paper, and any Fresnel effect between ink and paper is ignored.

The layering model described above does not completely solve the problem, as the measured spectral reflectance data for an ink includes information about the stock paper on which the ink was originally printed. To compute the result of removing one layer from another, the above equations were simply inverted:

$$F_i = F_{i,j}$$

$$R_i = \frac{(R_{i,j} - F_{i,j})}{(R_j - F_j)} + F_i$$

Division by zero in the above equation does not arise in practice, because inks are only removed from papers, and the papers have high overall reflectance spectra and low Fresnel components. Once the spectral reflectance information is determined for the paper, the individual inks on paper, and the combination of both inks on paper, the printing primaries $g_0$, $g_1$, $g_2$, and $g_{1,2}$ can be determined by first converting the appropriate spectral quantities to XYZ or RGB coordinates. Further details of the mapping procedure are discussed below.

Goals of Duotone Mapping

A key aspect of the present invention is the mapping that transforms the colors in the full color image onto the duotone gamut. There are many characteristics of colors and of sets of colors that one could seek to preserve in designing a mapping strategy. The fundamental tradeoff in the present case is between mapping colors from the full color image exactly and maintaining overall relationships between the colors. A preferred embodiment of the present invention places more importance on overall relationships than on exact matches of color, and weighs certain relationships more heavily than others.

The basic idea behind the mapping technique employed is to define an orthogonal axis system for each duotone gamut, then transform the colors of the full color image along two orthogonal directions and use a parallel projection along the third orthogonal direction. The choice of directions is clearly critical to the effectiveness of the mapping process and corresponds to preserving certain predetermined relationships between colors in the full color image at the expense of other relationships. The choices made for the mapping procedure in the preferred embodiment are as follows:

1. Preserve relative luminance. The eye is more sensitive to light at some wavelengths than others. The luminance-efficiency curve, which describes the relationship between wavelength and visual sensitivity, corresponds to a direction in a three-dimensional color space. Preserving separation of image colors along this direction of greatest sensitivity, called the luminance direction, is the primary goal of the preferred embodiment in the duotone mapping procedure. The Y axis of the XYZ color space corresponds exactly to the luminance direction, and therefore, Y is the direction of the first transformation.

2. Preserve ink-spread separation (color variation). The second relationship the preferred embodiment preserves in the mapping procedure is separation in the direction of most color variation on the duotone gamut. The curve on the gamut between the two individual ink primary colors selected describes the widest variation in color achievable with the selected paper and ink colors. Thus, the vector $g_2$–$g_1$ is the ideal direction for the second transformation. However, the duotone mapping requires an orthogonal axis system, and the Y axis has already been chosen. Therefore, $g_2$–$g_1$ is orthogonalized with respect to Y and the resulting ink-spread direction (or color variation axis) S is used as the direction of the second transformation.

3. Sacririce normal separation. Separation must be sacrificed in some direction in order to map points from three-dimensional space onto a surface (the duotone gamut). As two axes have already been chosen and because mutual orthogonality between all three axes used in the mapping process is required, a projection direction P is already defined by the choice of the Y and S axes, i.e., by the cross product Y×S. The P axis approximates the average normal of the bilinear surface of the duotone gamut, which is the direction of least color variation on the gamut. It is therefore a good direction in which to sacrifice separation.

Figure 3:
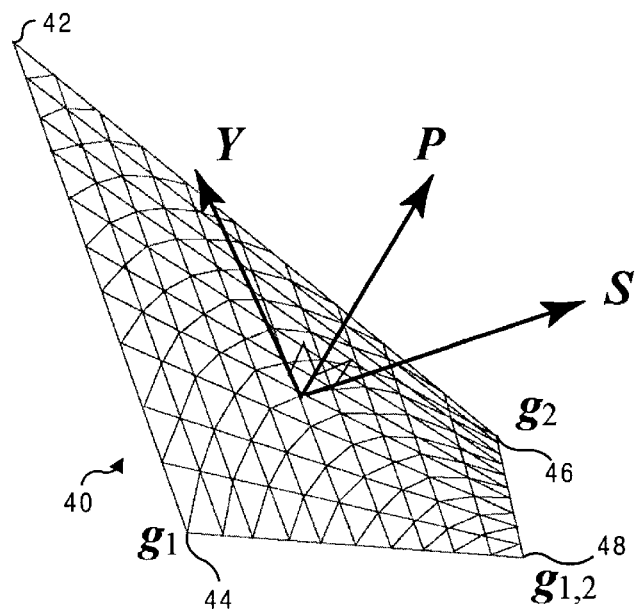
FIG. 3 is a duotone gamut on which are shown three orthogonal axes used in mapping colors from a full color image to the duotone gamut, in accord with the present invention.

Given a duotone gamut, the constraints listed above completely define the orthogonal axes used for the duotone mapping procedure. A typical example of the axes on duotone gamut 40 is illustrated in FIG. 3.

Computing the Duotone Mapping

The duotone mapping takes image colors $c_1, \ldots, c_n$ and maps them to colors $\hat{c}_1, \ldots, \hat{c}_n$ on the duotone gamut. The mapping of image color $c_i$ takes place in three steps, with each step affecting a different orthogonal component of $C_i$. The components are as follows:

$$c_i^Y = c_i \cdot Y$$

$$c_i^S = c_i \cdot S$$

$$c_i^P = c_i \cdot P$$

The same superscript notation is used to indicate the orthogonal components of the printing primaries $g_0$, $g_1$, $g_2$, and $g_{1,2}$.

Calculating the Luminance Transformation

The first transformation applied to the image colors is a mapping along Y to bring all colors within the full color image within the luminance range of the current duotone gamut. Although this mapping could be any monotonically increasing function, for the sake of simplicity a linear function is used. If $c_i^Y$ is the y-value of the original (full color) image color $c_i$, and $\hat{c}_i^Y$ is the y-value of the transformed color, the luminance transformation can be written as follows:

$$y_{min} = \min_i \{c_i^Y\}$$

$$y_{max} = \max_i \{c_i^Y\}$$

$$\hat{y}_{min} = \max\{y_{min}, \min\{g_0^Y, g_2^Y, g_{1,2}^Y\}\}$$

$$\hat{y}_{max} = \min\{y_{max}, \max\{g_0^Y, g_2^Y, g_{1,2}^Y\}\}$$

$$\hat{c}_i^Y = \hat{y}_{min} + \left(\frac{c_i^Y - y_{min}}{y_{max} - y_{min}}\right)(\hat{y}_{max} - \hat{y}_{min})$$

Figure 4:
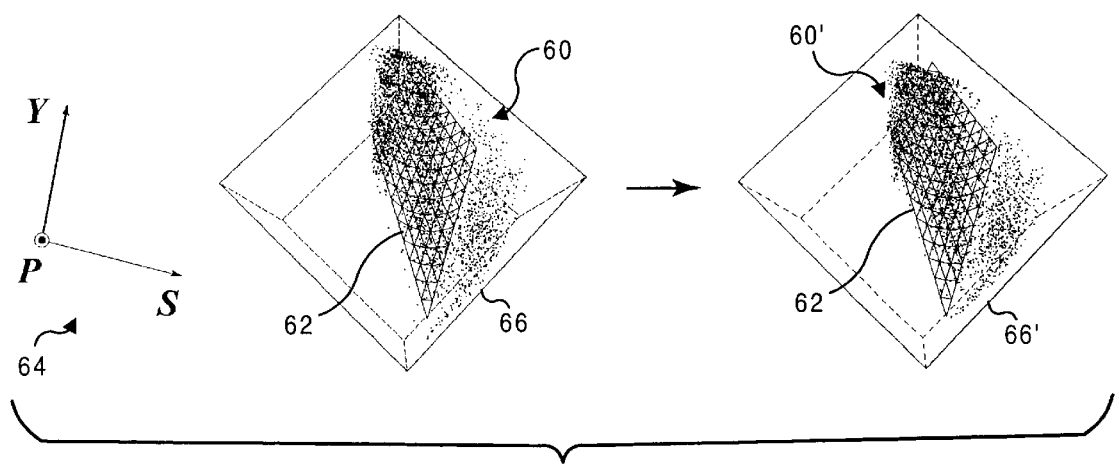
FIG. 4 illustrates the orthogonal axes used for transforming the colors of a full color image into a duotone gamut and shows the image colors both before and after a luminance transformation has occurred.

FIG. 4 shows a set of image colors (represented by black dots 60) for a full color image before and after their luminance values have been transformed to lie within the range of luminance values available in a typical duotone gamut 62, i.e., transformed relative to the Y luminance axis of orthogonal axes 64. A color space 66 illustrates the luminance range of image colors 60 before the luminance transformation. A color space 66' illustrates the range of the image colors after the luminance transformation; the range has been reduced by the luminance transformation so that relative to the luminance axis, the image colors fall within the luminance extents of the duotone gamut.

Calculating the Ink-Spread (Color Variation) Transformation

Figure 5:
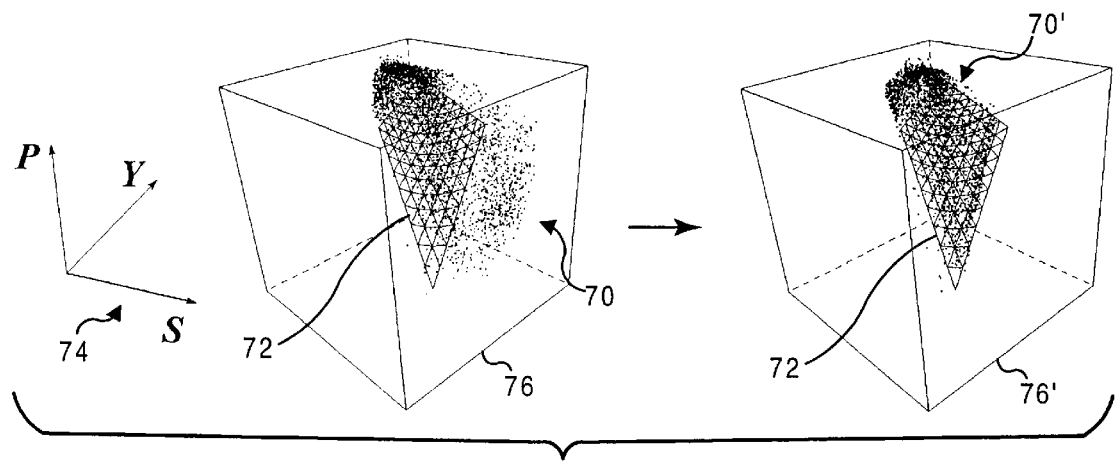
FIG. 5 illustrates the orthogonal axes used for transforming the colors of a full color image into a duotone gamut and shows the image colors both before and after a color variation transformation has occurred.

The second transformation is along the ink-spread (color variation) axis S. This transformation depends upon luminance, since at some luminance values along the Y axis, the duotone gamut is wide and at others it consists of a single point. Consider a particular luminance value $\hat{y}$ between $\hat{y}_{min}$ and $\hat{y}_{max}$. The values $\hat{s}_0$ and $\hat{s}_1$ can be defined to be the s-values of the points found by intersecting the edges of the duotone gamut with a plane of constant luminance $\hat{y}$. The ink-spread transformation at luminance value $\hat{y}$ brings the s-values of all image colors with luminance value $\hat{y}$ into the range [$\hat{s}_0$, $\hat{s}_1$]. FIG. 5 illustrates the effect of an ink-spread (color variation) transformation on a set of colors resulting from the transformation to the luminance range of the duotone gamut. The color variation of the colors from the full color image is shown in a color space 76 relative to a duotone gamut 72 before the color variation transformation. After the color variation transformation relative to the S axis of orthogonal axes 74, a color space 76' shows the reduced range of color variation of colors 70' so that the lie within the color variation extents of a duotone gamut 72, relative to the S axis.

In current preferred embodiment, the non-uniformity along Y is handled by separating colors into bins according to y-value and calculating a different transformation for each bin. The coherence among colors in most natural images prevents this discrete approach from introducing noticeable discontinuities into a duotone image.

The ink-spread (color variation) transformation, like the luminance transformation, can be any monotonically increasing function that maps the s-values of image colors to the s-values available on the duotone gamut. Both a simple linear mapping and a more complex mapping, based on Bézier curves, are discussed below.

Linear Mapping

The simplest transformation of s-values is a linear mapping, which can be defined in a manner similar to the luminance transformation. If only colors within a particular luminance bin are considered, the linear mapping is given by:

$$s_{\min} = \min_i \{c_i^s\}$$

$$s_{\max} = \max_i \{c_i^s\}$$

$$\hat{s}_{\min} = \max_i \{s_{\min}, \min\{\hat{s}_0, \hat{s}_1\}\}$$

$$\hat{s}_{\max} = \min_i \{s_{\max}, \max\{\hat{s}_0, \hat{s}_1\}\}$$

$$\hat{c}_i^s = \hat{s}_{\min} + \left(\frac{c_i^s - s_{\min}}{s_{\max} - s_{\min}}\right)(\hat{s}_{\max} - \hat{s}_{\min})$$

Figure 6A:
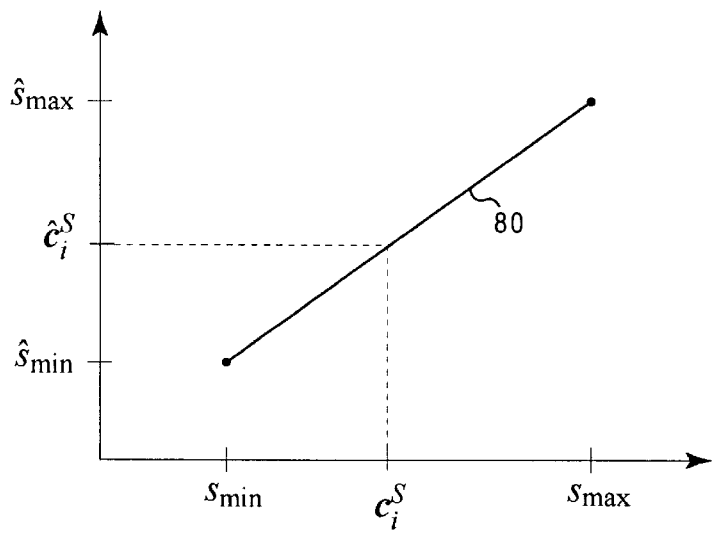
FIG. 6A is a graph showing a linear ink-spread transformation for a single luminance bin.

An example of linear ink-spread transformation for a single luminance bin is illustrated in FIG. 6A. A line 80 defines the linear ink-spread transformation from a color $c_i^S$ to a color $\hat{c}_i^S$ for one luminance bin.

Bézier-Curve Mapping

The linear mapping given above does not attempt to preserve the s-values of full color image colors, despite the fact that many such color values may be available in the duotone gamut. Instead, the linear mapping preserves the relationships between s-values of the full color image colors. At the other extreme, each s-value could be mapped to the closest value in the interval of available values $[\hat{s}_0, \hat{s}_1]$, thereby accurately reproducing some colors while clamping others to the interval endpoints.

Figure 6B:
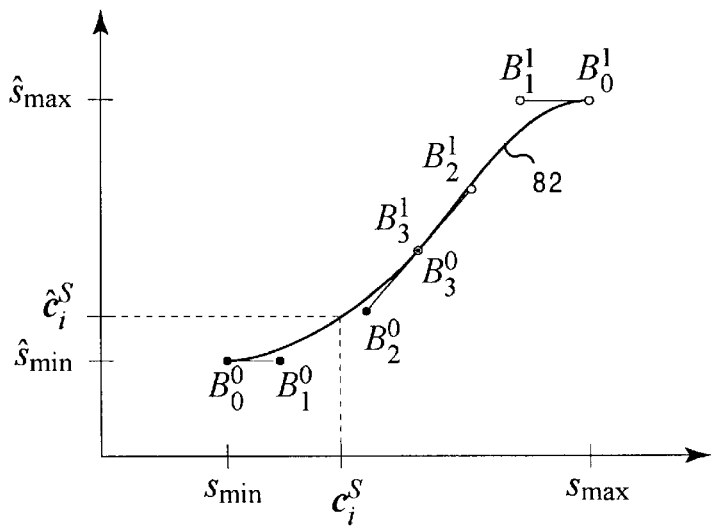
FIG. 6B is a graph showing a Bézier curve used for ink-spread transformation, for a typical luminance bin.

The preferred embodiment of the present invention preserves some of the benefits of both these alternatives. As a compromise, a mapping based on Bézier curves is implemented, as illustrated by a Bézier curve 82 in FIG. 6B for a typical luminance bin.

In the interest of brevity, the Bézier-curve mapping is only described qualitatively. As with the linear mapping, the two endpoints of the curve are constrained to map $s_{min}$ to $\hat{s}_{min}$ and $s_{max}$ to $\hat{s}_{max}$. However, because only two cubic Bézier curves are used that meet with $C^1$ continuity, there are five additional control points with which the behavior of the mapping process can be altered. These additional degrees of freedom are utilized to meet the constraints that follow.

First, the slope of the Bézier-curve mapping at either end (controlled by $B_1^0$ and $B_1^1$) is constrained to be zero, while the tangent at the middle of the curve (controlled by a segment $B_1^2-B_2^0$) is constrained to be parallel to the line (not shown) from $B_1^0$ to $B_1^1$. Together, these constraints impose a nonlinearity on the mapping process that tends to preserve separation of s-values for colors that are in the duotone gamut, while squeezing together the colors that are out of the duotone gamut. This approach strikes a balance between linear mapping and clamping values.

Second, the center of the Bézier curve is constrained to pass through the point $B_3^0=B_3^1$, which is chosen to lie on the line $\hat{s}=s$, so as to guarantee that s-values near the center of the mapping are preserved. The location of this center constraint is determined by intersecting the line from $g_0$ to $g_{1,2}$ with a plane of constant luminance $\hat{y}$. As a result, the constraint at the center of the Bézier curves prevents colors that are closer in hue to one ink color from mapping to the ink color on the opposite side of the duotone gamut.

The preferred implementation of the Bézier-curve mapping process relies on a lookup table in order to efficiently transform a value $c_i^S$ to a new value $\hat{c}_i^S$. The table corresponding to each luminance bin is determined before any colors of the full color image are transformed. A Bézier curve is evaluated at a large number of parameter values, and the resulting $(s, \hat{s})$ coordinates are stored in a table. Then, to map a value $c_i^s$, it is only necessary to find the correct interval of s-values and use linear interpolation to approximate the result $\hat{c}_i^S$.

Determining the Projection

Figure 7:
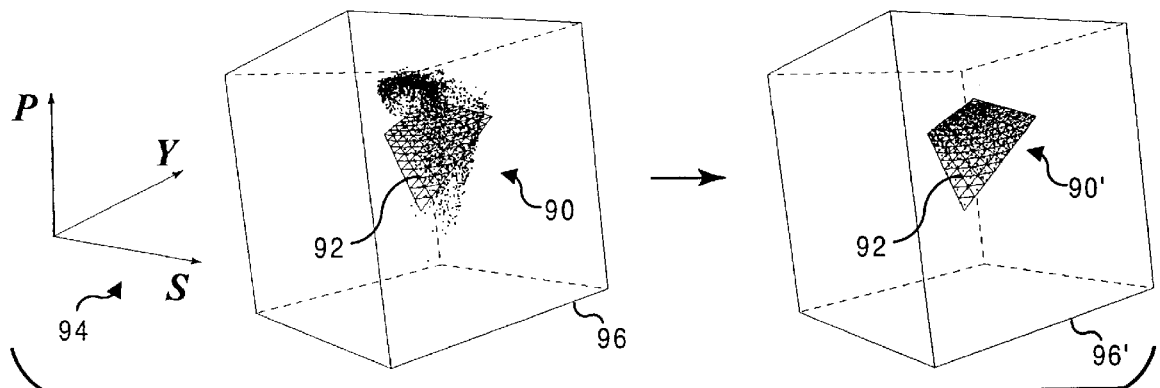
FIG. 7 illustrates the orthogonal axes used for transforming the colors of a full color image into a duotone gamut and shows the image colors (following the luminance and color variation transformations) both before and after a projection has occurred relative to the P axis.

Colors from the full color image that are transformed by the luminance and ink-spread mapping process described above are guaranteed to project onto the duotone gamut in the P direction. The projection point corresponding to a color can be determined analytically by solving for the intersection of a line and the bilinear surface defined by the Neugebauer equation. As shown below, a solution can be derived for $\alpha_1$ and $\alpha_2$, the amounts of the two inks required to produce the projected color in the duotone image. Thus, in addition to computing the desired color in the duotone image that corresponds to a color in the full colored image, the projection step determines the halftone separations required for the duotone printing process. FIG. 7 illustrates the result of projecting a set of colors for a full color image onto a duotone gamut.

Parallel Projection onto a Bilinear Surface

To project a color c in a direction P, onto a duotone gamut defined by the colors $g_0, g_1, g_2,$ and $g_{1,2}$, a solution, which is denoted by $\hat{c}$, must lie on a line that passes through c in the direction P. So, $\hat{c}=c+tP$ for some real number t, and the solution must also lie on the bilinear surface defining the duotone gamut:

$$\hat{c} = c + tP = \begin{bmatrix} g_0 & g_1 & g_2 & g_{1,2} \end{bmatrix} \begin{bmatrix} (1-\alpha_1)(1-\alpha_2) \\ \alpha_1(1-\alpha_2) \\ (1-\alpha_1)\alpha_2 \\ \alpha_1\alpha_2 \end{bmatrix}$$

for some values of $\alpha_1$ and $\alpha_2$. It is preferable to solve for the unknown ink amounts $\alpha_1$ and $\alpha_2$, rather than the projection point $\hat{c}$. The preceding equation can be rewritten by grouping the terms differently:

$$g_0-c-tP+(g_1-g_0)\alpha_1+(g_2-g_0)\alpha_2+(g_0+g_{1,2}-g_1-g_2)\alpha_1\alpha_2=0$$

Notice that the dot product of both sides of this equation taken with either the S direction or the Y direction will eliminate t, because P, S, and Y are defined to be mutually orthogonal. The two equations that result from these dot products can be written as follows:

$$u_1+u_2\alpha_1+u_3\alpha_2+u_4\alpha_1\alpha_2=0$$

$$v_1+v_2\alpha_1+v_3\alpha_2+v_4\alpha_1\alpha_2=0$$

where the constants $u_1, \ldots, u_4$ and $v_1, \ldots, v_4$ are given by:

$u_1=(g_0-c)\cdot S$
$u_2=(g_1-g_0)\cdot S$
$u_3=(g_2-g_0)\cdot S$
$u_4=(g_0+g_{1,2}-g_1-g_2)\cdot S$
$v_1=(g_0-c)\cdot Y$
$v_2=(g_1-g_0)\cdot Y$
$v_3=(g_2-g_0)\cdot Y$
$v_4=(g_0+g_{1,2}-g_1-g_2)\cdot Y$ The first dot product can be solved for $\alpha_2$ in terms of $\alpha_1$ to obtain:

$$\alpha_2 = \frac{u_1+u_2\alpha_1}{u_3+u_4\alpha_1}$$

When this expression for $\alpha_2$ is substituted into the second dot product equation and simplified, a quadratic equation for $\alpha_1$ alone is obtained:

$$w_1\alpha_1^2 + w_2\alpha_1 + w_3 = 0$$

where $$w_1 = u_4v_2 - u_2v_4$$

$$w_2 = u_4v_1 - u_1v_4 + u_3v_2 - u_2v_3$$

$$w_3 = u_3v_1 - u_1v_3$$

Therefore, the solution for $\alpha_1$ is given by:

$$\alpha_1 = \begin{cases} \dfrac{-w_2 \pm \sqrt{w_2^2 - 4w_1w_3}}{2w_1} & \text{if } w_1 \neq 0 \\ -\dfrac{w_3}{w_2} & \text{if } w_1 = 0 \end{cases}$$

When $w_1 \neq 0$, there are two possible projections of c onto the bilinear surface; a solution for $\alpha_1$ is chosen that results in a value between zero and one. Once $\alpha_1$ is obtained, $a_2$ can be computed from the above equation, and the projection point ĉ determined from the first equation in this section.

Logical Steps for Mapping Colors from Full Color Image to Duotone Gamut

A flow chart in FIG. 19 illustrates the logical steps employed for mapping colors from a full color image to a duotone gamut. From a start block, the logic proceeds to a block 140 that provides for converting the RGB data that define each color in the full color image to the XYZ color space. To simplify handling of the color data, an octree of the image colors is built in a block 142. A Y basis vector (luminance) is then set equal to the or Y axis of the XYZ color space in a block 144. Similarly, in a block 146, an S basis vector for ink spread or color variation is set equal to a line that is perpendicular or orthogonal to the Y basis vector and is closest to a line through the two ink colors selected for the duotone, $g_1$ and $g_2$. It will be recalled that these colors are at opposite sides of the duotone gamut. Next, the P basis vector, is determined by taking the cross product of the Y and the S basis vectors in a block 148.

In a block 150, the preferred embodiment calls for creating 256 bins of lookup tables for the S axis Bézier mapping of color variation to the duotone gamut. A block 152 provides for setting c to a first color in the octree created in block 142. Next, in a loop beginning at a block 154, the procedure linearly maps the Y component of the current color c to fit within the minimum and maximum luminance constraints of the duotone gamut, i.e., between $g_0$ and, $g_{1,2}$ and the minimum and maximum luminance components of the colors in the full color image. In a block 156, the ink spread or color variation component of c along the S basis axis is mapped to the duotone gamut values using the S axis Bézier mapping tables created in block 150. Finally, in a block 158, c is projected onto the duotone gamut along the P axis, while simultaneously solving for $\alpha_1$ and $\alpha_2$, to determine the duotone ink separations.

A decision block 160 determines if there are any more colors in the octree to be processed, and if not, the mapping procedure terminates in a block 162. However, if more colors remain, a block 164 provides for set c to the next color in the octree. The logic then loops back to block 154 to map that color into the duotone gamut.

Selecting Inks

The duotone mapping described above assumed that two inks were given. In the more general cases, neither ink or just one ink is specified by the user. The goal of the software program comprising the present invention is to find one or more good pairs of ink colors for producing a duotone of a given full color image, in addition to finding the halftone separations for those colors. A good pair of ink colors is one for which the duotone mapping process produces an image that is as close as possible to the original full-color image. The "closeness of two images" is defined as the pixel-wise $L^2$ distance measured in a perceptually uniform color space. Thus, the selection of one or two ink colors amounts to an optimization problem whose goal (or objective) is a function of the original image and ink colors. The preferred embodiment uses a simulated annealing process to solve this optimization problem.

Simulated Annealing

Simulated annealing is a heuristic optimization technique designed to avoid local minima. Transitions from a current state to another state are generated randomly and accepted with some probability. This "acceptance probability" depends both on the relative scores of the two states, as rated by the objective function, and on the value of a control parameter T. Unfavorable moves are likely when T is high, but are accepted with decreasing probability as T decreases. The term "cooling schedule" describes the rate at which T decreases and the number of moves made at each value of T. In regard to the problem of selecting color(s) of ink, a state consists of a pair of inks of different color, each of which has a set of neighbor inks. Taken together, the neighbor sets describe a fully connected graph. The set of legal moves from a state is the set of all possible moves to neighbor ink pairs from a given ink pair.

Simulated annealing is an ideal optimization technique for the present problem. A heuristic technique must be used because most interesting ink sets, such as the PANTONE® inks, contain hundreds of inks. In addition, preliminary experiments indicated that the objective function for this problem has many local minima. Finally, the large number of parameters associated with simulated annealing allows the optimizer to be tuned to meet the needs of the problem. In particular, by adjusting the cooling schedule and starting conditions, the optimizer is enabled to find several relatively deep local minima instead of a single global minimum. This adjustment is useful because it allows the software program to present several alternative choices of ink color pairs to the user.

Evaluating the objective function for solving this problem tends to be costly because it requires that every pixel color in the original full color image be transformed and the resulting color compared with its original value. In order to solve the optimization problem efficiently, the simulated annealer uses a low-resolution version of the color information present in the original full color image. Such low-resolution information can be obtained either by quantizing the colors in the original full color image or by reducing the size of the original full color image. The low-resolution information is then provided to the duotone mapping step instead of the original image colors, to evaluate the results, so that the user can choose between several suggested good pairs of ink colors.

Logical Steps for Selecting Colors using Simulated Annealing

Those of ordinary skill in the art will be familiar with the concept of simulated annealing, but it may be helpful to include a brief discussion of the steps involved in the process as applied to selecting colors of ink so as to optimize the reproduction of a full color image in a duotone image. The term "simulated annealing" arises from the similarity of the process to that used for annealing a metal by heating the metal to an elevated temperature and then cooling it according to a cooling schedule.

With reference to a start block in FIG. 20, the annealing process is initialized by setting a counter N to 1 in a block 170. A decision block 172 determines if the counter N is greater than a predefined variable, "SUGGESTIONS." In the preferred embodiment of the present invention, this variable is equal to seven, indicating that the simulated annealing process should return seven suggested pairs of ink colors. However, other values can be set for NSUGGESTIONS as required for a particular application. Once the counter N exceeds the variable NSUGGESTIONS, the process terminates at a block 174.

If the counter is less than the predetermined variable, the logic proceeds to a block 176, which sets a variable T to a variable INITIALTEMP. The variable INITIALTEMP has a relatively large value and corresponds to the original elevated temperature of a metal being annealed, or in the case of selecting colors, the variable simply indicates a starting point for the process. A block 178 set a variable P to represent a pseudorandom pair of ink colors arbitrarily selected from the full set of ink colors available for producing the duotone image. Next, in a block 180, an error is determined for the use of the P pair of ink colors to reproduce the full color image as a duotone image. This error is simply a measure of the distance between each color in the full color image and its corresponding color in the duotone image produced using the P pair of ink colors.

A block 182 provides for setting a variable Q equal to a neighbor of P, i.e., a pair of ink colors in the vicinity of the P ink colors. In a block 184, the process determines the error that arises in using the Q pair of ink colors to reproduce the full color image as a duotone image. A decision block 186 determines if there is another neighbor pair of ink colors relative to P, and if so loops back to block 182 to repeat the steps from that point in the logic. If not, the logic proceeds to a block 188, in which a variable R is set to a pseudorandom real number. A decision block 190 determines if the product R*T is less than a predefined variable THRESHOLD. If not, a block 192 sets P to an inferior neighbor of Q. However, if the product in decision block 190 is less than THRESHOLD, a block 194 sets P to the best neighbor Q. After block 192 or block 194, a block 196 decreases T based on a predefined cooling schedule.

A decision block 198 then determines if the new value of T is less than or equal to zero. If not, the logic loops back to block 182 to repeat the steps below that point. However, an affirmative response to decision block 198 leads to a block 200, which saves the pair P of ink colors in a suggestion list and increments the counter N. The logic then loops back to decision block 172 to determine if the desired number of suggestions has been achieved, and if not repeats the steps starting at block 176. To summarize, the simulated annealing process attempts to find a local minima of error resulting from using a pair of inks to reproduce the full color image as a duotone. Recognizing that such a local minima may not be the best choice, it allows for tests of pairs of ink colors neighboring the current pair with the hope that a better minima may be found, to identify a still better pair of ink colors. After each suggested pair is determined, the pseudorandom selection made in block 178 moves to a different pair of ink colors and repeats the process.

Outlying Clusters

Optionally, in a preferred embodiment of the present invention, clustering of image colors can be performed as a preprocessing step. Clusters of small size and large average distance from other clusters are marked as outlying clusters. Colors that have been identified as members of outlying clusters are ignored when calculating the ink-spread (color variation) transformation. The rationale is that such outlying colors matter less to the overall full color image, and that mapping them well at the expense of more prevalent colors to produce the duotone image is not justified. Colors that are ignored in calculating the ink-spread transformation may not project onto the duotone gamut. Each such color is transformed to a gray of the appropriate luminance, and that gray is then projected onto the gamut.

Black Enhancement

Full-color printing relies on three colored inks—cyan, magenta, and yellow—that combine to make black. However, a black halftone separation is usually printed in addition to the three color separations in a full color process. Adding a black separation permits denser blacks than the three colors can produce, allows more detail to be expressed in shadowed areas, substitutes inexpensive black ink for more expensive colored inks, and avoids a thick accumulation of ink in each black or very dark portion of the full color image.

Adding a black separation to duotone printing offers a further benefit: for full color images with a wide range of luminance values, the two-colored inks no longer need to be chosen so that their combination is close to black. Instead, the two ink colors can be chosen to reproduce the full color image's hues, while the black ink permits fine gradations in luminance to be achieved in the duotone image.

Extending the duotone process to support a black separation is simpler than the general problem of using three arbitrary inks (called a tritone process) to reproduce a full color image, thanks to the nearly accurate assumption that combining black ink with any other ink results in black. This assumption simplifies the problem in two ways. First, whereas a general tritone gamut is a bilinear volume according to the Neugebauer equations, a black-enhanced duotone gamut 100 is a volume bounded by four bilinear surfaces, ($g_0$, $g_1$, black), ($g_0$, $g_2$, black), ($g_1$, $g_{1,2}$, black), ($g_2$, $g_{1,2}$, black), and one bilinear surface, as illustrated in FIG. 8. (As shown therein, points 102, 104, 106, 108 respectively identify the colors $g_0$, $g_1$, $g_2$, and $g_{1,2}$, as discussed above in regard to a typical duotone gamut; however, black-enhanced duotone gamut 100 includes a point 109 indicating the color of the black ink.) Second, black enhancement can be implemented as a simple extension to the present invention using the following steps:

1. Subtract some amount of black from each color in the original full color image;
2. Apply the optimization and duotone mapping process discussed above to produce two color separations; and
3. Determine a black separation that adds back the appropriate amount of black to each color in the duotone gamut that will be used in producing the duotone image.

These three steps are illustrated in FIG. 9. A full color image 110 is represented by dots 112 in a color space 114. An image 116 and a corresponding color space 114' illustrate the original image after black has been removed. A duotone image 118 is then produced from image 116 as described above; it is based on a duotone gamut 120, as shown in a color space 122. Finally, a black-enhanced duotone image 124 and its corresponding duotone gamut 120' are illustrated, to show the improved luminance achieved by adding black ink to the duotone printing process.

Removing black from an image in order to create a better duotone image is similar to the four-color process of "under-color removal" (UCR), though slightly more complicated. Applying UCR to a color is fairly simple: a fraction of the minimum component of cyan, magenta, and yellow is removed from all three components comprising the color, and then replaced by an equal amount of black. The success of this technique hinges on the fact that cyan, magenta, and yellow combine to black, a property that is not necessarily true for the two ink colors used in producing a duotone image.

For duotones, removal of black from an RGB color c is performed by moving c in a straight line away from an RGB position 130 of black ink to a new position c', as shown in FIG. 10A. The amount of shift in position required depends on the color's saturation: a fully saturated color does not benefit from using any black, while a fully desaturated (gray) color benefits most from using pure black ink. Performing this operation on every color in the original full color image yields a new target image for input to the duotone mapping process described above.

Once the duotone mapping process has been applied to obtain new colors in the duotone gamut, the amount of black that should be used is determined by comparing the duotone colors to the original colors in the full color image. Because the primary emphasis is on preserving the luminance of full color image colors, the goal is to match the luminance of the corresponding color in the original full color image with the color that will be used instead in the duotone image. However, the complete range of original luminance values cannot be reproduced; instead an attempt is made to match a luminance scaled to lie between that of the paper color and that of the black ink that will be used for printing the duotone image. For each color c in the duotone image, a line segment is created from that color to the position of black ink. The position of ĉ is then shifted toward black until it achieves the desired luminance at a point 132, as illustrated in FIG. 10B. The amount of shifting required along the line through black determines the amount of black to print.

Minimized Hue Difference

For some very colorful full color images, even the best duotone image will not be able to adequately reproduce all colors. Mapping an unachievable original color to gray may produce a more pleasing duotone than mapping it to another color. To achieve this effect, an optional second pass is made over the duotone gamut, performed after the desired pair of ink colors has been selected. During the second pass, a pixel-by-pixel comparison of the duotone and the original image is performed, to enable the perceptual hue difference of each pixel to be determined. Hues are measured as hue angles in a perceptually uniform color space. In both L*a*b* and L*u*v*, a plane perpendicular to L* axis and passing through a particular brightness value contains a disk of all the hues present at that brightness, ranging from gray at the center to saturated colors on the edge. In regard to this technique, the hue angle of a color is defined as $$h_{uv} = \tan^{-1}(v^*/u^*)$$

or $$h_{ab} = \tan^{-1}(b^*/a^*).$$

The perceptual hue difference between two colors is the difference between the hue angles of the colors.

The procedure used for reducing hue differences in the present invention proceeds by desaturating (moving toward gray) each pixel in the original full color image by an amount parameterized by the magnitude of the hue difference computed for that pixel. The duotone mapping process is then applied to the grayed-out image. In addition to reducing offensive hue mappings, graying-out parts of the original full color image may improve the ink-spread (color variation) transformation by bringing $s_{min}$ and $s_{max}$ closer to $\hat{s}_{min}$ and $\hat{s}_{max}$. Effectively, minimizing hue difference treats some potentially significant image colors like outliers, sacrificing them so that other colors will be mapped better.

Colored Paper

The paper used for printing a duotone image need not be white. For an original full color image without much white, using a colored paper can greatly improve a duotone image reproduction by providing an additional color essentially for free. A preferred embodiment of the present invention optionally enables the user to specify a paper color or leave the choice of paper to be automatically determined so as to optimize the duotone image reproduction of a full color image. The simulated annealing algorithm is modified to select a paper color by extending the definition of a state to include two inks and a paper color.

It is important to note that the colors in a duotone image that are surrounded by an expanse of colored paper (as might occur in a yellow pages directory) appear quite different from the colors in the same duotone image printed to cover all of the paper (as in a postcard). The difference is caused by adaptation effects in the visual system, which allow a subtle color to be perceived as white when nothing perceptually closer to white is present. It is contemplated that quantitative models of adaptation might improve a duotone image, which is surrounded by an expanse of colored paper.

Performance

When a preferred embodiment of the present invention was executed on a 133 MHz Silicon Graphics, Inc. INDIGO® computer, it took approximately five minutes to find three good ink pairs, using the clustered version of an image, and an ink set of more than 400 inks. While the process of automatically selecting ink colors is not interactive, it only needs to be run once for a given image. For a 300×300 pixel image, producing full-size color separations and a preview duotone image took approximately four seconds on the same computer.

To test the present invention, duotone images were printed on a printing press and the results compared to reference prints of the full color images. While ordinarily a reproduction should look as much as possible like a photograph or an image displayed on a monitor, to evaluate the present invention for printing duotone image, duotone prints were compared to four-color process prints of the original full color image.

All of the original full color images were stored as RGB colors; in order to transform those colors to match the colors obtained from a four-color printing process, an RGB correction function was used. Data for the RGB correction was generated by printing (on a four-color press) a square for each color in a regular three-dimensional grid of colors spanning the RGB cube. Each printed square was scanned using a spectrophotometer and the spectral data were then converted to an RGB color. For this set of colors, a mapping was constructed from intended RGB values to actual printed RGB values. Using piecewise-trilinear interpolation between these discrete colors, any given RGB color can be transformed to the corresponding RGB color that four-color process printing would produce.

A second aspect of the color printing experiments also required color correction. The Neugebauer model is not entirely accurate in its prediction of colors obtained by halftoning two colors of ink. Therefore, in keeping with the empirical spirit of printing, an empirical correction method was developed for adjusting duotone separations. This duotone correction is similar to the RGB correction, but it was necessary to measure data for only two dimensions. Using the two selected colors of ink, a regular grid of values for $\alpha_1$ and $\alpha_2$ were printed. Once again, the RGB color of each square in the grid was measured. Locating each measured RGB color on the duotone gamut associates intended percentages with printed percentages of inks. Using bilinear interpolation, a mapping from intended amounts to actual printed amounts was constructed. Applying the inverse of this function to a pair of separations before printing compensates for the simplicity of the Neugebauer model.

It should be noted that while the RGB transformation is valid for all images, the duotone correction is only accurate for the particular pair of inks that was measured. Since one of the goals of the present invention is to make printing duotones inexpensive and easy, multiple printings of the duotone images should not be necessary to achieve a desired result. Therefore, an average correction function was calculated based on the duotone correction functions for three different pairs of inks. This average correction was used for most of the results in the examples described below.

EXAMPLES

Example 1, which is shown in FIGS. 11A–11D, depicts a painting by Cézanne printed with four-color process inks (FIG. 11A) and as three duotone images. The first two duotone images, both printed with black and gold, demonstrate the difference between the traditional approach to printing duotones (FIG. 11B) and the approach used in the present invention (FIG. 11C). The traditional duotone was created using Adobe PHOTOSHOP®. The last duotone image in the series (FIG. 11D), printed with black ink and two ink colors selected by the optimization process described above, demonstrates black enhancement.

Some very different images reproduce well using a single pair of inks. Conversely, certain images reproduce well using several remarkably different pairs of inks. Example 2 shows a photograph of a koala printed in process color in FIG. 12A and as a duotone image in FIG. 12B. Example 3 depicts a painting by Renoir in full process colors (FIG. 13A) and as two duotones. The first duotone of the Renoir painting (FIG. 13B) uses the same pair of user-selected inks as the duotone of the koala photograph in FIG. 12B. Choosing an unrelated pair of inks for the second duotone of the Renoir painting results in a very different, but still successful reproduction in FIG. 13C.

Figure 15B:
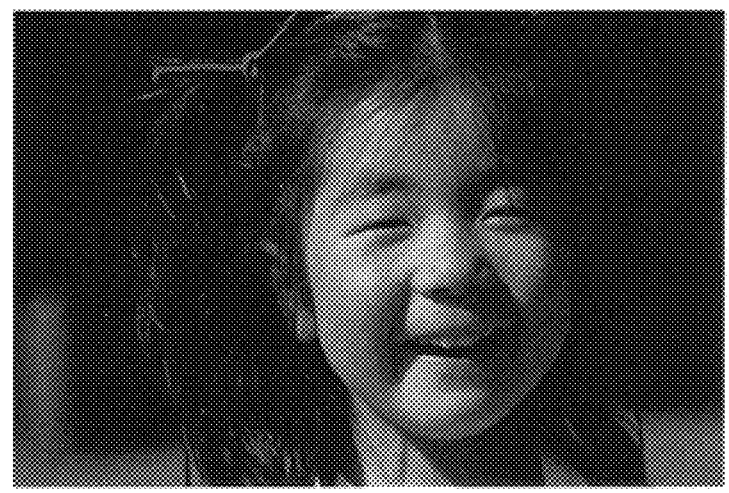

Though skin tones are notoriously difficult to reproduce, photographs of people are not beyond the scope of two-color duotone image reproduction with the present invention. Examples 4, 5, and 6 show three portrait photographs printed in full process colors (FIGS. 14A, 15A, and 16A, respectively) and as duotones (FIGS. 14B, 15B, and 16B, respectively). All three duotones are printed with blue and orange-brown inks that were selected by the optimizer process for the photograph in Example 4 (FIG. 14A).

Example 7 shows a photograph of a sunset in full process color (FIG. 17A) and as a black-enhanced duotone printed with hand-picked inks (FIG. 17B). Viewed on a computer monitor, the original image contains colors not present in the full color process gamut. These colors are better achieved in a duotone that has not undergone the correction described in the previous section. Using the same inks, an uncorrected black-enhanced duotone was as the final duotone image (FIG. 17C) in the series.

Example 8 shows a painting by Schiele printed in full process color (FIG. 18A) and as a duotone image on yellow paper with optimizer-selected inks (FIG. 18B). Using colored paper allows the three dominant hues (yellow, red, and green) present in the original image to be reproduced.

System for Implementing the Present Invention

As noted above, an initial prototype of the present invention was first implemented on a Silicon Graphics, Inc. INDIGO workstation. However, it is contemplated that the present invention can be executed on other types of workstations or personal computers. With reference to FIG. 21, a generally conventional graphic workstation 230 is illustrated, which is suitable for use in practicing the present invention, i.e., workstation 230 comprises a system on which the present invention is implemented. The workstation includes a processor chassis 232 in which are mounted a hard drive 236 and, optionally, a floppy disk drive 234. A motherboard within the processor chassis is populated with appropriate integrated circuits (not shown) and a power supply (also not shown). A monitor 238 is included for displaying graphics and text generated by software programs executed by the workstation, and more specifically for displaying images that are processed and produced by the present invention. A mouse 240 (or other pointing device) is connected to a serial port (or to a bus port) on the rear of processor chassis 232, and signals from mouse 240 are conveyed to the motherboard to control a cursor and to select text, menu options, and graphic components displayed on monitor 238 in response to software programs executing on the workstation, including the software program implementing the present invention. In addition, a keyboard 243 is coupled to the motherboard for entry of text and commands that affect the running of software programs executing on the workstation.

Workstation 230 also optionally includes a compact disk-read only memory (CD-ROM) drive 247 into which a CD-ROM disk may be inserted so that executable files and data on the disk can be read for transfer into the memory and/or into storage on hard drive 236 of workstation 230. Typically, workstation 230 is coupled to a local area and/or wide area network and is one of a plurality of such workstations on the network. In many cases, files accessed by these workstations will be stored on a server (not shown) accessed over the network.

Although details relating to all of the components mounted on the motherboard or otherwise installed inside processor chassis 232 are not illustrated, FIG. 22 illustrates some of the functional components that are included. The motherboard includes a data bus 233 to which these functional components are electrically connected. A display interface 235 generates signals in response to instructions executed by a central processing unit (CPU) 253 that are transmitted to monitor 238 so that graphics and text are displayed on the monitor. A hard drive/floppy drive interface 237 is coupled to data bus 233 to enable bidirectional flow of data and instructions between data bus 233 and floppy drive 234 and/or hard drive 236. Software programs executed by CPU 253 are typically stored on either hard drive 236, or on a floppy disk (not shown) that is inserted into floppy drive 234. The software program comprising machine language instructions that cause the CPU to implement the present invention will likely be distributed either on such a floppy disk, or on a CD-ROM disk. Alternatively, the software program may be distributed over the Internet.

A serial/mouse port 239 is also bidirectionally coupled to data bus 233, enabling signals developed by mouse 240 to be conveyed through the data bus to CPU 253. A CD-ROM interface 259 connects CD-ROM drive 247 to data bus 233. The CD-ROM interface may be a small computer systems interface (SCSI) type interface or other interface appropriate for connection to and operation of CD-ROM drive 247. Although a CD-ROM drive is indicated, it is also contemplated that other types of optical storage devices and appropriate interface might also be used.

A keyboard interface 245 receives signals from keyboard 243, coupling the signals to data bus 233 for transmission to CPU 253. Coupled to data bus 233 is a network interface 250 (which may comprise, for example, an Ethernet® card for coupling the workstation to a local area and/or wide area network). Thus, software used in connection with the present invention may optionally be stored on a remote server and transferred to workstation 230 over the network to implement the present invention.

When a software program is executed by CPU 253, the machine instructions comprising the program that are stored on a floppy disk, a CD-ROM, a server (not shown), or on hard drive 236 are transferred into a memory 251 via data bus 233. Machine instructions comprising the software program are executed by CPU 253, causing it to implement functions determined by the machine instructions. Memory 251 includes both a nonvolatile read only memory (ROM) in which machine instructions used for booting up workstation 230 are stored, and a random access memory (RAM) in which machine instructions and data are temporarily stored when executing application programs, such as the software program implementing the present invention.

Discussion of Other Aspects of the Present Invention

A key aspect of the method employed by the present invention is the duotone mapping: the transformation of a set of scattered image colors for a full color image onto a surface (of the duotone gamut) in three-dimensional color space. The mapping preserves relationships between image colors at the expense of matching exact colors. It is clear that many other mappings are possible; some of the difficulties that exist with mapping in general and with alternatives to the method used in a preferred embodiment of the present invention are as follows:

Finding the closest color. The obvious problem with the approach of mapping an image color to the closest point on the duotone gamut is that out-of-gamut image colors will be clamped. While clamping may be acceptable for certain images and duotone gamuts, in general clamping results in artificial discontinuities and a loss of information.

Using orthogonal projection. Using an orthogonal rather than a parallel projection would complicate the ink-spread (color variation) transformation, making it a function of three variables rather than two: ŝ=f(y, s, p). A more fundamental difficulty with an orthogonal projection is the absence of an obvious continuous mapping, since there are colors in the full color image for which there is no orthogonal projection onto the duotone gamut.

It is contemplated that the present invention might also apply to the more general problem of finding the best n ink colors (not limited to two) with which to reproduce an image. Based on the option noted above to choose a paper as well as inks as an extension to the optimization algorithm, it is apparent that the algorithm may be extended to take advantage of psychophysical effects such as von Kries adaptation and simultaneous contrast. These effects may allow a user of the invention to effectively expand the printing gamut by tricking the eye into seeing colors that are not actually achievable.

Another possible extension to the present invention is a system that facilitates the production of two-color brochures by optimizing over images, inks, and papers. The system would take several images as input and choose two inks, one paper, and a specified number of the images that would reproduce well with the selected inks and paper.

The present invention has no sense of what parts of images are semantically or aesthetically important. Because the creation of a duotone image from a full color image frequently requires loss of color information, the approach taken in the above disclosed embodiment would benefit from user input indicating which colors in the original image are most important to preserve. It is further contemplated that the duotone mapping process of the present invention be combined with the artistic screening approach to halftoning presented by Ostromoukhov and Hersch, "Artistic Screenings" Proceedings of SIGGRAPH 95, pages 219–228, ACM, New York, 1995.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for producing a duotone image using only two colors, said duotone image corresponding to a full color image defined by color data, comprising the steps of:

(a) enabling a user to select up to two colors that will be used to produce the duotone image;

(b) determining a gamut that includes any color selected by the user, said step further including the step of automatically selecting each color not selected by the user for the gamut based on the color data and any color selected by the user so as to minimize a color error between the duotone image and the full color image, said gamut being defined by the two colors that will be used for producing the duotone image; and (c) mapping the color data for the full color image onto the gamut to determine duotone data that define how the two colors are combined to produce the duotone image, said duotone data being determined so as to maximize preservation of selected predeterminedd attributes of the full color image in the duotone image.

2. The method of claim 1, further comprising the step of enabling the user to select a background color for the duotone image.

3. The method of claim 2, wherein if the user does not select a background color, further comprising the step of automatically determining a background color for the duotone image so as to maximize preservation of the selected predetermined attributes of the full color image in the duotone image.

4. The method of claim 1, wherein the step of mapping the color data comprises the step of scaling luminance values for the full color image to a range of luminance values for the gamut.

5. The method of claim 4, wherein a relative luminance of the full color image is a predetermined attribute having a maximum priority, so that preservation of the relative luminance has a highest priority when mapping the color data for the full color image to the gamut.

6. The method of claim 1, wherein the step of mapping comprises the step of scaling the predetermined attributes along two of three orthogonal axes, so that the predetermined attributes are disposed about the gamut.

7. The method of claim 6, wherein the two of the three orthogonal axes are respectively a relative luminance axis and a color variation axis.

8. The method of claim 6, wherein the step of scaling comprises the steps of:
   (a) selecting a plurality of different values on the relative luminance axis as prospective origins of the color variation axis; and
   (b) for each value selected on the relative luminance axis, scaling the color variation along a corresponding color variation axis.

9. The method of claim 8, wherein the step of scaling the color variation comprises the step of transforming colors in the full color image that are outside the gamut into colors within the gamut, colors in the full color image that are further from the gamut being shifted proportionately more when thus transformed, than colors in the full color image that are closer to the gamut.

10. The method of claim 9, further comprising the step of projecting a third axis that is orthogonal to the relative luminance axis and the color variation axis, by determining a cross product of the relative luminance axis and the color variation axis.

11. The method of claim 10, wherein the third axis corresponds to an average normal of a bilinear surface of the gamut.

12. The method of claim 1, wherein the step of automatically selecting each color not selected by the user comprises the step of employing a simulated annealing technique that is sensitive to local minima of color error.

13. The method of claim 1, further comprising the steps of clustering colors in the full color image; and classifying any clusters of colors that are outside the gamut as outlying colors, said outlying colors not being considered in the step of mapping the color data for the full color image onto the gamut.

14. The method of claim 1, further comprising the step of employing a black separation to produce the duotone image, in addition to the two colors.

15. The method of claim 14, further comprising the steps of removing a portion of black from the full color image before the step of mapping the color data for the full color image; and determining the black separation so as to restore to the duotone image at least some of a full range of luminance that is present in the full color image.

16. A method for producing a duotone image using two colors, said duotone image corresponding to a full color image defined by color data, comprising the steps of:
   (a) determining a gamut defined by the two colors; and
   (b) mapping the color data for the full color image to the gamut to produce duotone data, so as to:
      (i) maximize luminance in the duotone data relative to a luminance of the full color image; and
      (ii) maximize color variation in the duotone data relative to the full color image.

17. The method of claim 16, further comprising the steps of:
   (a) enabling a user to select up to two colors for the gamut; and
   (b) automatically determining any of the two colors for the gamut not selected by user based on the color data and any color selected by the user so as to minimize a color error between the duotone image and the full color image.

18. The method of claim 17, wherein the step of automatically determining any of the two colors for the gamut not selected by the user is implemented using a heuristic technique.

19. The method of claim 16, further including the steps of:
   (a) enabling the user to select a color of paper for use as a background in producing the duotone image; and
   (b) if the user does not select a color of paper, automatically determining an optimum color of paper for the background to maximize the variation of colors in the duotone image relative to the full color image.

20. The method of claim 16, wherein obtaining a maximum luminance in the duotone image has a higher priority than obtaining a maximum color variation.

21. The method of claim 16, wherein the step of mapping comprises the steps of:
   (a) determining a luminance axis for the gamut that maximizes a luminance of the duotone image;
   (b) at selected values along the luminance axis, determining a plurality of color variation axes, each of which is orthogonal to the luminance axis;
   (c) selecting a color variation axis that tends to provide a maximum color variation in the gamut for the duotone image, relative to the full color image data;
   (d) determining a projection axis that is orthogonal to both the color variation axis and the luminance axis; and
   (e) transforming the color data for the full color image onto the gamut by scaling the color data along the luminance axis, the color variation axis, and the projection axis.

22. The method of claim 16, further comprising the steps of:
   (a) clustering the color data;
   (b) classifying clusters of less than a predefined size that are greater than a predefined distance from other clusters as outlying clusters; and
   (c) transforming the outlying clusters to grays of an appropriate luminance that are projected onto the gamut.

23. The method of claim 16, further comprising the steps of:
   (a) removing a portion of black from the color data for the full color image before mapping the color data to the gamut; and
   (b) determining a black separation for use in restoring a broader range of luminance to the duotone image when it is produced, so that the duotone image more closely corresponds to that of the full color image.

24. A system for defining a duotone image to be produced using two colors, said duotone image corresponding to a full color image defined by color data, comprising:
   (a) a memory in which are stored a plurality of machine instructions; and
   (b) a processor, coupled to the memory, for implementing a plurality of functions when executing the machine instructions stored in the memory, said plurality of functions including:
      (i) enabling a user to select up to two colors that will be used to produce the duotone image;
      (ii) determining a gamut that includes any color selected by the user, said step further including the step of selecting each color not selected by the user for the gamut based on the color data and any color selected by the user so as to minimize a color error between the duotone image and the full color image, said gamut being defined by the two colors that will be used for producing the duotone image; and
      (iii) mapping the color data for the full color image onto the gamut to determine duotone data that define how the two colors are combined to produce the duotone image, said duotone data being determined so as to maximize preservation of selected predetermined attributes of the full color image in the duotone image.

25. The system of claim 24, wherein the machine instructions executing on the processor enable the user to select a background color for the duotone image.

26. The system of claim 25, wherein if the user does not select a background color, the machine instructions executing on the processor further automatically determine a background color for the duotone image so as to maximize preservation of the selected predetermined attributes of the full color image in the duotone image.

27. The system of claim 24, wherein when mapping the color data, the processor scales luminance values for the full color image to a range of luminance values for the gamut.

28. The system of claim 27, wherein a relative luminance of the full color image is a predetermined attribute having a maximum priority, so that preservation of the relative luminance has a highest priority when mapping the color data for the full color image to the gamut.

29. The system of claim 24, wherein when mapping the color data, the machine instructions cause the processor to scale the predetermined attributes of the color data along two of three orthogonal axes, so that the predetermined attributes are disposed about the gamut.

30. The system of claim 29, wherein the two of the three orthogonal axes are respectively a relative luminance axis and a color variation axis.

31. The system of claim 29, wherein when scaling the predetermined attributes, the machine instructions cause the processor to:

(a) select a plurality of different values on the relative luminance axis as prospective origins of the color variation axis; and (b) for each value selected on the relative luminance axis, scale the color variation along a corresponding color variation axis.

32. The system of claim 31, wherein when scaling the color variations, the machine instructions cause the processor to transform color data for the full color image that are outside the gamut into colors within the gamut, color data in the full color image that are further from the gamut being shifted proportionately more when thus transformed, than color data in the full color image that are closer to the gamut.

33. The system of claim 32, wherein the machine instructions further cause the processor to project a third axis that is orthogonal to the relative luminance axis and the color variation axis, by determining a cross product of the relative luminance axis and the color variation axis.

34. The system of claim 33, wherein the third axis corresponds to an average normal of a bilinear surface of the gamut.

35. The system of claim 24, wherein when automatically selecting each color not selected by the user the machine instructions cause the processor to use a simulated annealing technique that is sensitive to local minima of color error.

36. The system of claim 24, wherein the machine instructions further cause the processor to cluster colors in the full color image; and classify any clusters of colors that are outside the gamut as outlying colors, said outlying colors not being considered by the processor when mapping the color data for the full color image onto the gamut.

37. The system of claim 24, wherein the machine instructions further cause the processor to employ a black separation to produce the duotone image, in addition to the two colors.

38. The system of claim 37, wherein the machine instructions cause the processor to remove a portion of black from the color data for the full color image before the step of mapping the color data to the gamut; and determine the black separation so as to restore to the duotone image at least some of a full range of luminance that is present in the full color image.

\* \* \* \* \*